United States Patent
Perreault et al.

(10) Patent No.: US 9,762,145 B2
(45) Date of Patent: Sep. 12, 2017

(54) ENHANCED STACKED SWITCHED CAPACITOR ENERGY BUFFER CIRCUIT

(71) Applicants: David J. Perreault, Brookline, MA (US); Khurram K. Afridi, Lexington, MA (US); Minjie Chen, Cambridge, MA (US); Steven B. Leeb, Belmont, MA (US); Arthur Hsu Chen Chang, Irvine, CA (US)

(72) Inventors: David J. Perreault, Brookline, MA (US); Khurram K. Afridi, Lexington, MA (US); Minjie Chen, Cambridge, MA (US); Steven B. Leeb, Belmont, MA (US); Arthur Hsu Chen Chang, Irvine, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 612 days.

(21) Appl. No.: 14/362,163

(22) PCT Filed: Jan. 17, 2013

(86) PCT No.: PCT/US2013/022001
§ 371 (c)(1),
(2) Date: Jun. 2, 2014

(87) PCT Pub. No.: WO2013/109797
PCT Pub. Date: Jul. 25, 2013

(65) Prior Publication Data
US 2014/0339918 A1 Nov. 20, 2014

Related U.S. Application Data

(60) Provisional application No. 61/587,308, filed on Jan. 17, 2012, provisional application No. 61/594,990, filed on Feb. 3, 2012.

(51) Int. Cl.
*H02M 3/06* (2006.01)
*H02M 7/537* (2006.01)
(Continued)

(52) U.S. Cl.
CPC .............. *H02M 7/537* (2013.01); *H01G 4/30* (2013.01); *H01G 4/38* (2013.01); *H02J 5/00* (2013.01);
(Continued)

(58) Field of Classification Search
CPC ........ H02M 7/537; H02M 7/217; H01G 4/30; H01G 4/38; H02J 5/00
See application file for complete search history.

(56) References Cited

U.S. PATENT DOCUMENTS 5,561,597 A 10/1996 Limpaecher
5,744,988 A 4/1998 Condon et al.
(Continued)

FOREIGN PATENT DOCUMENTS

WO WO 2013/109719 A1 7/2013
WO WO 2013/109743 A2 7/2013
(Continued)

OTHER PUBLICATIONS

PCT International Preliminary Report on Patentability for PCT/US2013/024552 dated Aug. 14, 2014; 9 pages.
(Continued)

*Primary Examiner* — Daniel Cavallari
(74) *Attorney, Agent, or Firm* — Daly, Crowley, Mofford & Durkee, LLP

(57) ABSTRACT

A stacked switched capacitor (SSC) energy buffer circuit includes a switching network and a plurality of energy storage capacitors. The switching network need operate at only a relatively low switching frequency and can take advantage of soft charging of the energy storage capacitors
(Continued)

to reduce loss. Thus, efficiency of the SSC energy buffer circuit can be extremely high compared with the efficiency of other energy buffer circuits. Since circuits utilizing the SSC energy buffer architecture need not utilize electrolytic capacitors, circuits utilizing the SSC energy buffer architecture overcome limitations of energy buffers utilizing electrolytic capacitors. Circuits utilizing the SSC energy buffer architecture (without electrolytic capacitors) can achieve an effective energy density characteristic comparable to energy buffers utilizing electrolytic capacitors. The SSC energy buffer architecture exhibits losses that scale with the amount of energy buffered, such that a relatively high efficiency can be achieved across a desired operating range.

30 Claims, 19 Drawing Sheets

(51) Int. Cl.
  H01G 4/38   (2006.01)
  H02M 7/217  (2006.01)
  H02J 5/00   (2016.01)
  H01G 4/30   (2006.01)
(52) U.S. Cl.
  CPC ......... H02M 7/217 (2013.01); Y02T 10/7022 (2013.01)

(56) References Cited

U.S. PATENT DOCUMENTS

| | | | |
|---|---|---|---|
| 6,198,645 B1 * | 3/2001 | Kotowski | H02M 3/07 307/110 |
| 6,834,001 B2 * | 12/2004 | Myono | H02M 3/07 327/536 |
| 7,279,957 B2 * | 10/2007 | Yen | H02M 3/07 327/536 |
| 7,535,133 B2 | 5/2009 | Perreault et al. | |
| 7,589,605 B2 | 9/2009 | Perreault et al. | |
| 7,889,519 B2 | 2/2011 | Perreault et al. | |
| 8,026,763 B2 | 9/2011 | Dawson et al. | |
| 8,212,541 B2 | 7/2012 | Perreault et al. | |
| 8,451,053 B2 | 5/2013 | Perreault et al. | |
| 8,503,203 B1 * | 8/2013 | Szczeszynski | H02M 3/073 307/110 |
| 8,718,188 B2 | 5/2014 | Balteanu et al. | |
| 8,824,978 B2 | 9/2014 | Briffa et al. | |
| 8,829,993 B2 | 9/2014 | Briffa et al. | |
| 8,830,710 B2 | 9/2014 | Perreault et al. | |
| 2004/0125618 A1 * | 7/2004 | De Rooij | H02J 1/102 363/17 |
| 2005/0162144 A1 * | 7/2005 | Kernahan | H02M 3/157 323/300 |
| 2005/0213267 A1 | 9/2005 | Azrai et al. | |
| 2005/0286206 A1 * | 12/2005 | Togashi | H01G 4/012 361/306.3 |
| 2005/0286278 A1 | 12/2005 | Perreault et al. | |
| 2008/0032473 A1 | 2/2008 | Bocek et al. | |
| 2008/0265586 A1 | 10/2008 | Like et al. | |
| 2009/0002066 A1 | 1/2009 | Lee et al. | |
| 2009/0059630 A1 * | 3/2009 | Williams | H02M 3/07 363/60 |
| 2009/0278520 A1 * | 11/2009 | Perreault | H02M 3/07 323/282 |
| 2010/0080023 A1 * | 4/2010 | Jain | H02M 3/07 363/65 |
| 2010/0126550 A1 | 5/2010 | Foss | |
| 2010/0237710 A1 * | 9/2010 | Fagg | H02M 3/07 307/110 |
| 2011/0026281 A1 | 2/2011 | Chapman et al. | |
| 2011/0193515 A1 | 8/2011 | Wu et al. | |
| 2011/0221346 A1 | 9/2011 | Lee et al. | |
| 2011/0221398 A1 | 9/2011 | Ferber, Jr. | |
| 2011/0273020 A1 | 11/2011 | Balachandreswaran et al. | |
| 2012/0119676 A1 | 5/2012 | Yao | |
| 2013/0241625 A1 | 9/2013 | Perreault et al. | |
| 2014/0120854 A1 | 5/2014 | Briffa et al. | |
| 2014/0167513 A1 | 6/2014 | Chang et al. | |
| 2014/0313781 A1 | 10/2014 | Perreault et al. | |
| 2014/0355322 A1 | 12/2014 | Perreault et al. | |
| 2015/0023063 A1 | 1/2015 | Perreault et al. | |
| 2015/0084701 A1 | 3/2015 | Perreault et al. | |

FOREIGN PATENT DOCUMENTS

| | | |
|---|---|---|
| WO | WO 2013/109797 A1 | 7/2013 |
| WO | WO 2013/116814 A1 | 8/2013 |

OTHER PUBLICATIONS

PCT International Preliminary Report on Patentability for PCT/US2013/021886 dated Jul. 31, 2014 9 pages.
PCT International Preliminary Report on Patentability for PCT/US2013/021926 dated Jul. 31, 2014 9 pages.
PCT International Preliminary Report on Patentability for PCT/US2013/022001 dated Jul. 31, 2014 9 pages.
U.S. Appl. No. 14/416,654, filed Jan. 23, 2015, Perreault, et al.
U.S. Appl. No. 14/416,737, filed Feb. 11, 2015, Perreault, et al.
U.S. Appl. No. 14/401,981, filed Nov. 18, 2014, Perreault.
U.S. Appl. No. 14/435,914, filed Apr. 15, 2015, Perreault, et al.
U.S. Appl. No. 14/758,033, filed Jun. 26, 2015, Perreault, et al.
U.S. Appl. No. 14/791,685, filed Jul. 6, 2015, Perreault, et al.
U.S. Appl. No. 14/837,616, filed Aug. 27, 2015, Briffa, et al.
U.S. Appl. No. 14/823,220, filed Aug. 11, 2015, Barton, et al.
U.S. Appl. No. 14/934,760, filed Nov. 6, 2015, Briffa et al.
U.S. Appl. No. 14/920,031, filed Oct. 22, 2015, Briffa et al.
U.S. Appl. No. 14/968,045, filed Dec. 14, 2015, Perreault et al.
U.S. Appl. No. 14/974,563, filed Dec. 18, 2015, Perreault et al.
U.S. Appl. No. 14/975,742, filed Dec. 19, 2015, Perreault et al.
Notice of Allowance dated Feb. 29, 2016 corresponding to U.S. Appl. No. 14/233,912; 18 Pages.
Notice of Allowance dated Mar. 30, 2016; for U.S. Appl. No. 14/232,103; 17 pages.
U.S. Appl. No. 15/149,491, filed May 9, 2016, Perreault, et al.
U.S. Appl. No. 15/290,402, filed Oct. 11, 2016, Perreault, et al.
U.S. Appl. No. 15/287,068, filed Oct. 6, 2016, Briffa, et al.
U.S. Appl. No. 15/354,170, filed Nov. 17, 2016, Briffa, et al.
Chang et al.; "A Systems Approach to Photovoltaic Energy Extraction;" 27th Annual IEEE Applied Power Electronics Conference and Exposition; Feb. 5-9, 2012; 18 pages.
Pease; "What's All This Common-Centroid Stuff, Anyhow?;" Electronic Design; Oct. 1, 1996; 4 pages.
PCT Search Report and Written Opinion of the ISA dated May 31, 2013; for PCT Pat. App. No. PCT/US2013/21886; 12 pages.
PCT Search Report and Written Opinion of the ISA dated Jul. 26, 2013; for PCT Pat. App. No. PCT/US2013/21926; 12 pages.
PCT Search Report and Written Opinion of the ISA dated May 3, 2013; for PCT Pat. App. No. PCT/US2013/22001; 15 pages.
PCT Search Report and Written Opinion of the ISA dated Jun. 10, 2013; for PCT Pat. App. No. PCT/US2013/24552; 14 pages.

* cited by examiner

ENHANCED STACKED SWITCHED CAPACITOR ENERGY BUFFER CIRCUIT

BACKGROUND

This application is a U.S. National Stage entry under 35 U.S.C. §371 of PCT Application No. PCT/US2013/022001, filed Jan. 17, 2013 and published in the English language and, which claims the benefit of U.S. provisional application no. 61/587,308 filed Jan. 17, 2012, and U.S. provisional application no. 61/594,990 filed Feb. 3, 2012, which applications are hereby incorporated herein by reference in their entireties.

As is also known, the flow to and from such an energy buffer is at twice the line frequency (e.g., 120 Hz in the United States). The buffering energy requirement can be calculated as $E_{buf}=P/\omega_{line}$. Because the energy storage requirement of the buffer is proportional to the system average power (P) and the (relatively long) line period ($T=2\pi/\omega$), the size of the required energy buffer cannot be reduced simply through increases in switching frequency of an interface power converter. Thus, energy buffering requirements represent a significant limitation on miniaturization of grid interface systems.

One important consideration associated with twice-line-frequency energy buffering relates to lifetime and reliability. Conventional power conversion systems typically utilize electrolytic capacitors to provide high-density energy storage for buffering. It is, however, widely appreciated that despite providing the best available energy density and providing small DC bus voltage variation, electrolytic capacitors also represent a significant source of system lifetime and reliability problems. Also, electrolytic capacitors can only be operated over a narrow charge/discharge range at 120 Hz for thermal and efficiency reasons (i.e., associated with RMS current limits and efficiency requirements). These considerations directly limit the energy buffering capability of electrolytic capacitors at 120 Hz. Thus, while typical peak energy storage densities of up to 0.9 J/cm$^3$ can be achieved with electrolytic capacitors, the allowable energy swing at 120 Hz yields practical energy densities that are about an order of magnitude lower. Hence, the development of energy buffering circuits that eliminate electrolytic capacitors while maintaining high energy storage density and high efficiency is one important requirement to achieving future grid interface systems that have both a small size and a high reliability.

It is known that film capacitors have a reliability and lifetime which is higher than electrolytic capacitors, but it is also known that film capacitors have considerably lower peak energy density than electrolytic capacitors (by an order of magnitude).

However, because film capacitors can be efficiently charged and discharged over a much wider voltage range compared with charge/dis-charge voltage ranges of electrolytic capacitors, for 120 Hz buffering, energy densities similar to those achieved with practical systems which utilize electrolytic capacitors can be achieved with high-reliability film capacitors, so long as a wide variation of the capacitor voltage can be used.

One approach to develop energy buffering circuits that eliminate electrolytic capacitors utilizes active filter blocks (essentially bidirectional DC-DC converters). The active filter block approach effectively utilizes film capacitors while maintaining a desired narrow range bus voltage. While this approach is flexible in terms of it use, it unfortunately leads to low buffering efficiency if high power density is to be maintained, due to losses in the active filter.

Other systems have incorporated the required energy buffering as part of the operation of the grid interface power stage. This approach can offset a portion of the buffering loss associated with introduction of a complete additional power conversion stage, but still introduces high-frequency loss and is quite restrictive in terms of operation and application.

As is also known in the prior art, energy buffering can be employed in many non-line-frequency applications where there is a energy transferred between a first source or load having a slow rate of varying power and/or a limited instantaneous power rating (perhaps a dc source or load) and a second source or load that has a component of power that varies faster and/or to an instantaneous value larger than that desired to be sourced or absorbed by the first source or load. For example, such applications include interfacing a battery system (which is desired to be efficiently charged or discharged at a limited rate and with a limited peak power) to a mechanical system that requires rapidly varying power flow and perhaps large peak power (e.g., by using a power converter driving an electromechanical system such as a motor). In such a system, an energy buffer is desired to provide the local-time difference between the power sourced or absorbed by the first source or load and the second source or load (e.g., the difference between that desired for the battery and that required by the power converter and motor for the mechanical system). In such applications, an energy buffer may be provided by an ultracapacitor or energy buffer system including one or more ultracapacitors. Applications requiring energy buffering of the nature described here may include, without limitation, motor drives, electric and hybrid vehicle drive trains, cranes, renewable energy systems including wind and wave energy systems, active filter and reactive power compensation systems, traction systems, laser driver systems, electromagnetic launch systems, electromagnetic guns, electromagnetic brakes and propulsion systems, and power systems for implanted medical devices.

SUMMARY

In accordance with the concepts, systems, circuits and techniques described herein, a stacked switched capacitor (SSC) energy buffer circuit comprises a plurality of series-connected blocks of switches and capacitors. The capacitors are preferably of a type that can be efficiently charged and discharged over a wide voltage range over a buffering time period of interest (e.g., film capacitors for line-frequency applications, and electrolytic capacitors or ultracapacitors for mechanical system time scale applications). Thus, selection of the particular capacitor type and characteristics depends, at least in part, upon the particular application and the buffering time period. In some embodiments, ultra-capacitors or electrolytic capacitors could be used. The switches are disposed to selectively couple the capacitors to enable dynamic reconfiguration of both the interconnection among the capacitors and their connection to a buffer port. The switches are cooperatively operated as a switching network such that the voltage seen at the buffer port varies only over a small range as the capacitors charge and discharge over a wide range to buffer energy.

With this particular arrangement, an energy buffer circuit having an effective energy density which is relatively high compared with the effective energy density of conventional energy buffer circuits is provided. In some embodiments, efficiency can be extremely high because the switching network need operate at relatively low (e.g. line-scale)

switching frequencies, and the system can take advantage of soft charging or adiabatic charging of the energy storage capacitors to reduce loss. Moreover, the stacked switched capacitor buffer architecture described herein exhibits losses that reduce as energy buffering requirements reduce such that high efficiency can be achieved across an entire desired operating range.

In accordance with a further aspect of the concepts, systems, circuits and techniques described herein a grid interface power converter comprises an first filter having a first port adapted to receive an input voltage from a DC source, a resonant high frequency isolated DC-DC converter having a first port coupled to a second port of the first filter, a resonant high frequency inverter having a first port coupled to a second port of the resonant high frequency isolated DC-DC converter and having a second port coupled to a first port of a second fitter with the second filter having a second port adapted to receive an input voltage from a AC source. The grid interface power converter further comprises a stacked switched capacitor (SSC) energy buffer circuit coupled between the second port of the resonant high frequency isolated DC-DC converter and the first port of the resonant high frequency inverter. By appropriately modifying switch states of the SSC energy buffer circuit, the SSC energy buffer circuit absorbs and delivers energy over a wide individual capacitor voltage range, while maintaining a narrow-range voltage at the input port. This enables maximal utilization of the energy storage capability.

In accordance with a further aspect of the concepts, systems, circuits and techniques described herein a grid interface power converter comprises a DC-DC converter having a first port adapted to connect to a DC source or load, a DC-AC converter having a first port coupled to a second port of the DC-DC converter and having a second port adapted to connect to a AC source or load. The grid interface power converter further comprises a stacked switched capacitor (SSC) energy buffer circuit coupled between the second port of the DC-DC converter and the first port of the DC-AC converter. By appropriately modifying switch states of the SSC energy buffer circuit, the SSC energy buffer circuit absorbs and delivers energy over a wide individual capacitor voltage range, while maintaining a narrow-range voltage at the input port. This enables relatively high utilization, and in some cases maximal utilization, of the energy storage capability.

With this particular arrangement, an energy buffering approach applicable to a wide range grid-interface power electronic applications is provided. Grid-interface power electronic applications include but are not limited to photovoltaic inverters, motor drives, power supplies, off-line LED drivers and plug-in hybrid electric vehicle chargers. Use of the energy buffering approach described herein results in improved reliability and lifetime in these and other applications.

In one embodiment, a stacked switched capacitor (SSC) energy buffer circuit includes a switching network comprised of a plurality of switches and a plurality of energy storage capacitors which may be provided as film capacitors. Switches in the switching network are configured to selectively couple at least one of the energy storage capacitors in series across a bus voltage. The switching network need operate at only a relatively low switching frequency, and the system can take advantage of soft charging of the energy storage capacitors to reduce loss. Thus, efficiency of the SSC energy buffer circuit can be extremely high compared with the efficiency of other energy buffer circuits. Furthermore, since circuits utilizing the SSC energy buffer architecture need not utilize electrolytic capacitors, circuits utilizing the SSC energy buffer architecture overcome limitations of energy buffers which do utilize electrolytic capacitors. Furthermore, circuits utilizing the SSC energy buffer architecture (but not using utilizing electrolytic capacitors) can achieve an effective energy density characteristic comparable to energy buffers which utilize electrolytic capacitors. In some cases, circuits using the SSC energy buffer architecture, either with or without electrolytic capacitors, can achieve higher effective energy than a circuit using electrolytic capacitors alone for the same voltage ripple. Moreover, the SSC energy buffer architecture exhibits losses that scale with the amount of energy that must be buffered, such that a relatively high efficiency can be achieved across a desired operating range.

In accordance with a further aspect of the concepts, systems, circuits and techniques described herein, a stacked switched capacitor (SSC) energy buffer circuit having first and second terminals includes a first sub circuit comprising one or more capacitors, a second sub-circuit comprising one or more capacitors and one or more switches disposed in at least one of said first and second sub-circuits. The one or more switches are cooperatively operated to selectively couple the one or more capacitors within and/or between the first and second sub-circuits. In a first operating mode, the first and second sub-circuits are serially coupled and the one or more switches are operable to enable dynamic reconfiguration of how the capacitors are coupled to the terminals of the sub-circuit.

In one embodiment, the one or more switches are operable to dynamically reconfigure the interconnection among the capacitors within at least one of said first and second sub-circuits.

In one embodiment, in at least some operating modes of the SSC energy buffer circuit, the one or more switches are operable to prevent the capacitors from ever being connected together at both terminals.

In accordance with a further aspect of the concepts, systems, circuits and techniques described herein, a switched capacitor based energy buffer architecture that restricts the apparent voltage ripple while utilizing a large fraction of energy in stored in capacitors is described. The switched capacitor based energy buffer architecture allows successfully replacement of electrolytic capacitors with film capacitors to achieve longer lifetimes while at the same time maintaining small volume. Also, when used with film capacitors, it can increase the life of grid-interfaced power converters by eliminating limited-life electrolytic capacitors while maintaining comparable energy density.

In one embodiment, an enhanced version of a bipolar SSC energy buffer that achieves a higher effective energy density and round-trip efficiency, while maintaining favorable bus voltage ripple is described. The enhanced buffer uses fewer capacitors and switches than the previous designs. The enhancement in performance is achieved by modifying the control and switching patterns of the buffer switches. A prototype enhanced SSC energy buffer, designed for a 320V bus and a 135 W load, has been built and tested. The design methodology and experimental results for the enhanced SSC energy buffer are presented and compared with the original design. The Stacked Switched Capacitor (SSC) energy buffer is an architecture for buffering energy between single-phase ac and dc.

DETAILED DESCRIPTION

Figure 1:
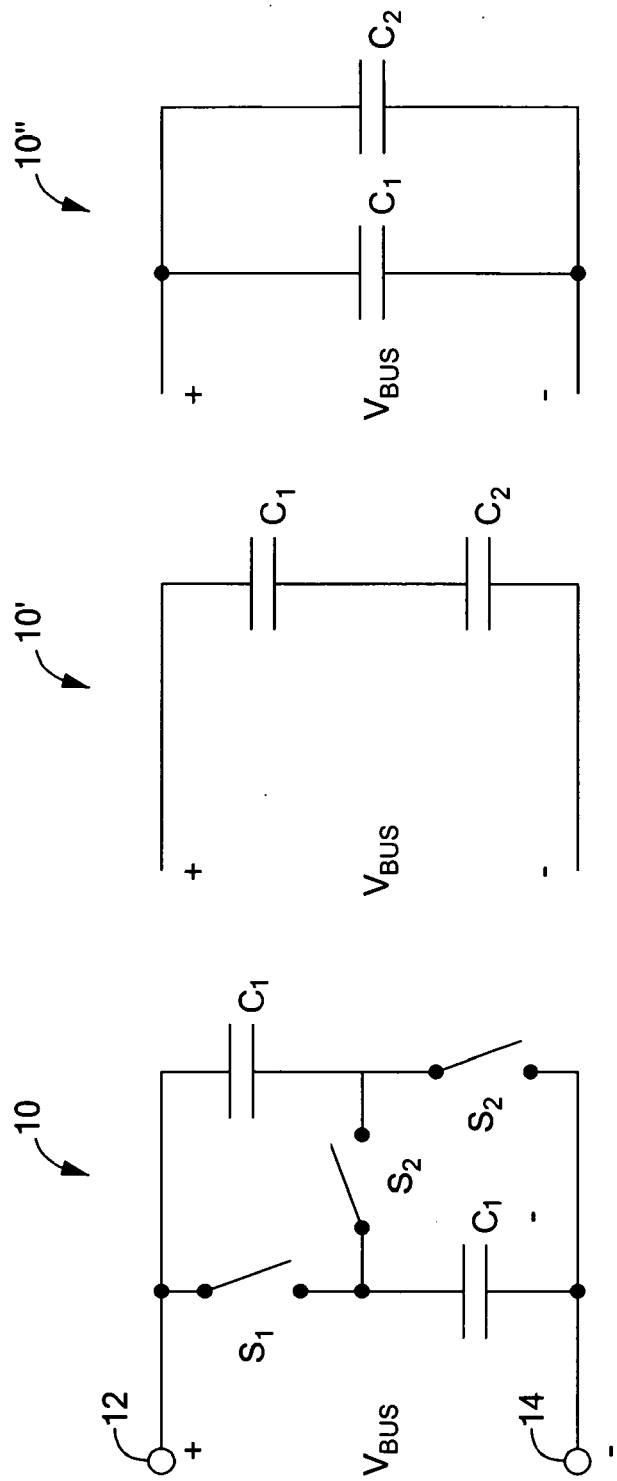
FIG. 1A is circuit diagram of a parallel-series switched capacitor circuit.
FIGS. 1B and 1C are circuit diagrams of two configurations associated with FIG. 1A for different switch states.

Described herein is a switched capacitor structure referred to herein as stacked switched capacitor (SSC) energy buffer circuit. Although reference is sometimes made herein to use of an energy buffer circuit in a particular application, it should be appreciated that the energy buffer circuits, concepts and techniques described herein find use in a wide variety of applications. For example, many applications exist in which an energy buffer is used because either a peak power rating or a desired energy transfer rating of a first source or load is different from that of the source or load to which it interfaces. It should be recognized that the concepts, systems, circuits and techniques described herein can be used in these applications to achieve one or more of: higher energy density/smaller size at a given voltage variation level, higher reliability by using more desirable energy storage elements.

The SSC energy buffer circuit provides a small variation of a bus voltage, $V_{bus}$ while also providing high utilization of available peak energy storage capacity. In one embodiment, a variation of 12.5% or less is provided while providing utilization of available peak energy storage capacity of 72.7% or better. The SSC energy buffer circuit and related techniques described herein achieves extremely high efficiency (e.g., by using film capacitors) and uses simpler circuitry. The SSC energy buffer circuit and related techniques described herein achieves extremely high energy density e.g., by incorporating film capacitors, electrolytic capacitors or ultracapacitors and employing them over a wider voltage range than appears at the input port. The SSC energy buffer circuit and related techniques described herein provide performance characteristics comparable to or better than conventional energy buffer circuits while at the same time utilizing fewer switches and capacitors than conventional energy buffer circuits. The SSC energy buffer circuit includes a number of variations as will be described herein.

Referring to FIGS. 1A to 1C, switched capacitor circuits that reconfigure capacitors between parallel and series combinations have been used to improve the energy utilization of ultracapacitors. A circuit 10 is a simple version of a parallel-series switched capacitor circuit. The circuit 10 includes switches $S_1$, $S_2$, $S_3$ and two capacitors $C_1$ and $C_2$. The circuit 10 also includes a terminal 12 and a terminal 14 (collectively referred to herein as a buffer port) to provide a bus voltage, $V_{bus}$, cross the terminals 12, 14. When switches $S_1$ and $S_3$ are open and $S_2$ is closed, the resulting configuration is represented by a circuit 10' as shown in FIG. 1B depicting capacitors $C_1$ and $C_2$ in series. When switches $S_1$ and $S_3$ are closed and $S_2$ is open, the resulting configuration is represented by a circuit 10" shown in FIG. 1C depicting capacitors $C_1$ and $C_2$ in parallel.

While the circuit 10 has a high capacitor energy utilization of 93.75% which is relatively high compared with prior art approaches, the circuit 10 also has a voltage ripple ratio of 33.3% which is also relatively high compared with prior art approaches. That is, the valve of the bus voltage, $V_{bus}$, varies by as much as 33.3%. For example, in one embodiment, the voltage of the dc bus varies from $0.67V_{nom}$ to $1.33V_{nom}$ where $V_{nom}$ is the average (nominal) value of the bus voltage. More complex parallel-series switched capacitor circuits have also been developed which achieve a better voltage ripple ratio; however, these complex parallel-series switched capacitors have high circuit complexity when high energy utilization and small voltage ripple are required. For example, a circuit currently having among the best performance (e.g., a 8-6-5-4-3 parallel-series switched capacitor circuit) has an energy utilization of 92.09% and a voltage ripple ratio of 14.3%, but requires 41 switches and 120 capacitors making the circuit relatively complicated and thus relatively difficult to implement for use in practical circuits and systems.

Figure 2:
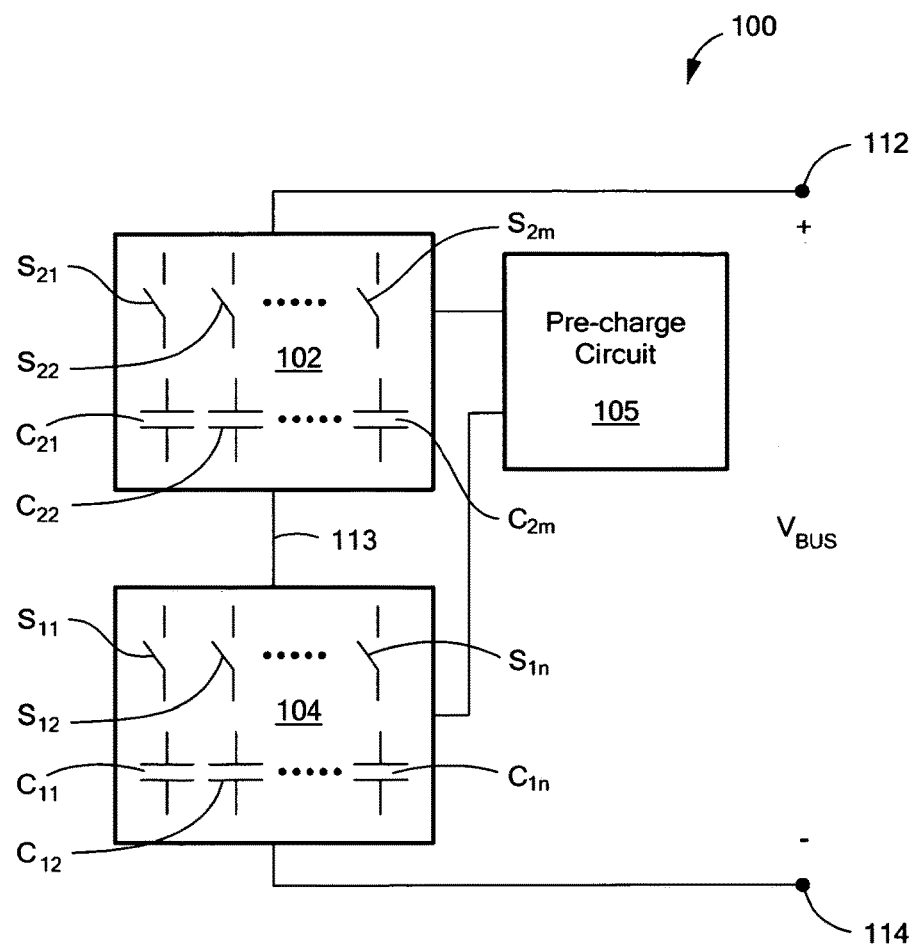
FIG. 2 is a circuit diagram of a stacked switched capacitor (SSC) energy buffer circuit.

Referring to FIG. 2, a stacked switched capacitor (SSC) energy buffer circuit 100 overcomes the deficiencies of the switched capacitor circuits like that of the circuit 10 (FIG. 1). The SSC energy buffer circuit 100 includes a first set of circuitry 102 and a second set of circuitry 104 connected in series, SSC energy buffer circuit 100 further includes a pre-charge circuit 105. For reasons which will become apparent from the description provided herein below, pre-charge circuit 105 is coupled to each of the two sub-circuits 102, 104 and pre-charge circuit 105 is operable to charge each of one or more capacitors in two sub-circuits 102, 104 to specified initial conditions before entering a first operating mode. In some cases, the pre-charge circuit 105 may be coupled in series with each of the two sub-circuits 102, 104 before entering a first operating mode, and further connections of the pre-charge circuit 105 to capacitors within the two sub-circuits 102, 104 may be made with switches in the two sub-circuits 102, 104

The circuit 100 also includes a terminal 112, a terminal 113 and a terminal 114. Terminals 112, 114 collectively form a buffer port to provide the bus voltage, $V_{BUS}$. Each set of circuitry 102, 104 includes capacitors.

As illustrated in FIG. 2, the first set of circuitry 102 includes capacitors $C_{11}, C_{12}, \ldots, C_{1n}$ and the second set of circuitry 104 includes capacitors $C_{21}, C_{22}, \ldots, C_{2m}$ where n and m are integers greater than or equal to one. The capacitors $C_{11}, C_{12}, \ldots, C_{1n}, C_{21}, C_{22}, \ldots, C_{2m}$, are of a type that can be efficiently charged and discharged over a wide voltage range (e.g., film capacitors electrolytic capacitors and ultra capacitors).

Each set of circuitry also includes switches. As illustrated in FIG. 2, the first set of circuitry 102 includes switches $S_{11}$, $S_{12}, \ldots, S_{1n}$ and the second set of circuitry 104 includes switches $S_{21}, S_{22}, \ldots, S_{2m}$ connected in series with a respective one capacitor. For example, the switch $S_{11}$ is in series with the capacitor $C_{11}$, the switch $S_{12}$ is in series with the capacitor $C_{12}$, the switch $S_{21}$ is in series with the capacitor $C_{21}$, the switch $S_{22}$ is in series with the capacitor $C_{22}$ and so forth. The switches $S_{11}, S_{12}, \ldots, S_{1m}$ and $S_{21}$, $S_{22}, \ldots, S_{2n}$ enable dynamic reconfiguration of both the interconnection among the capacitors and their connection to the buffer port to provide the bus voltage, $V_{bus}$.

Figure 4:
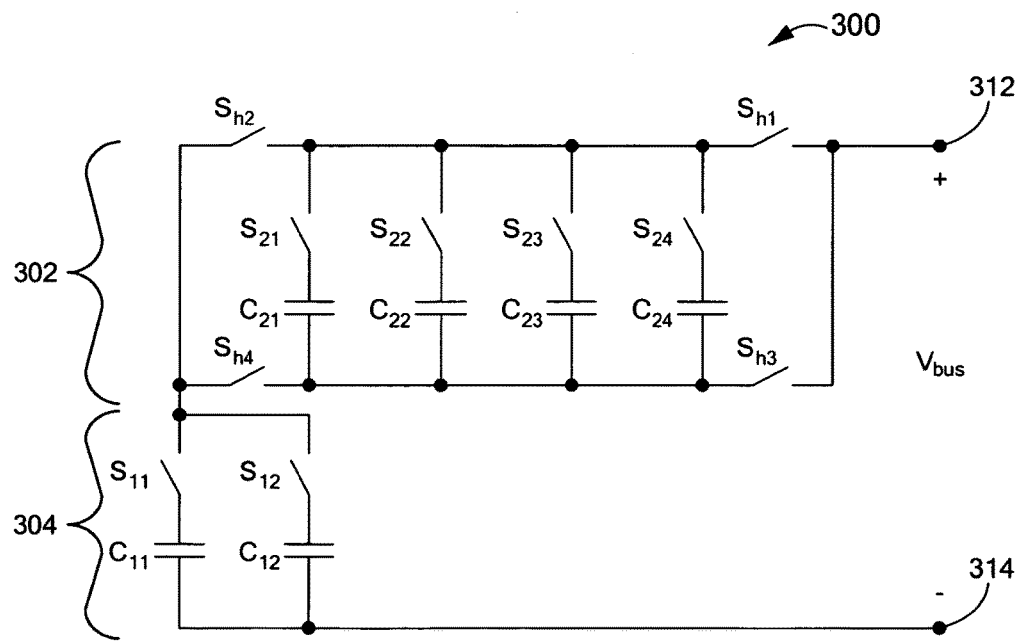
FIG. 4 is a circuit diagram of an example of the SSC energy buffer circuit called a 2-4 bipolar SSC energy buffer circuit.
Figure 6:
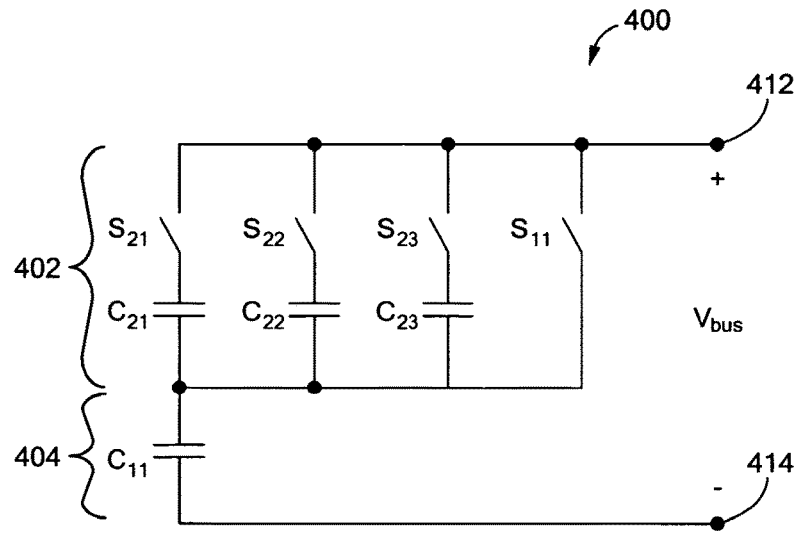
FIG. 6 is a circuit diagram of another example of the SSC energy buffer circuit called a 1-3 unipolar SSC energy buffer circuit.

It should, of course, be appreciated that in some implementations there is no one-to-one correspondence between capacitors and switches, that is, a "leg" can be just a capacitor as $C_{11}$ is in FIG. 6, just a switch as $S_{11}$ is in FIG. 6, or a switch in series with a capacitor as in many cases. Also one of the blocks can have switches not associated with a "leg" to allow the "legs" of that block to be connected in reverse, as $S_{h1}, S_{h2}, S_{h3}$ and $S_{h4}$ do in FIG. 4.

The switching in the circuit 100 (i.e., opening and closing of the switches) is preferably performed such that the voltage seen at the buffer port, $V_{bus}$, varies only over a small range as the capacitors charge and discharge over a wide voltage range to buffer energy, thereby providing as high effective energy density. By appropriately modifying the switch states, the buffer capacitors absorb and deliver energy over a relatively wide individual voltage range, while maintaining a relatively narrow-range voltage at the input port. This enables a high degree of utilization (and in some cases, even maximal utilization) of the capacitor energy storage capability. Efficiency of the circuit 100 can be extremely high because the switches in the circuit 100 need operate at only very low (line-scale) switching frequencies. Also, the circuit 100 can take advantage of soft charging of the energy storage capacitors to reduce loss. Moreover, the circuit 100 exhibits losses that reduce as energy buffering requirements reduce such that high efficiency can be achieved across the full operating range.

Figure 3:
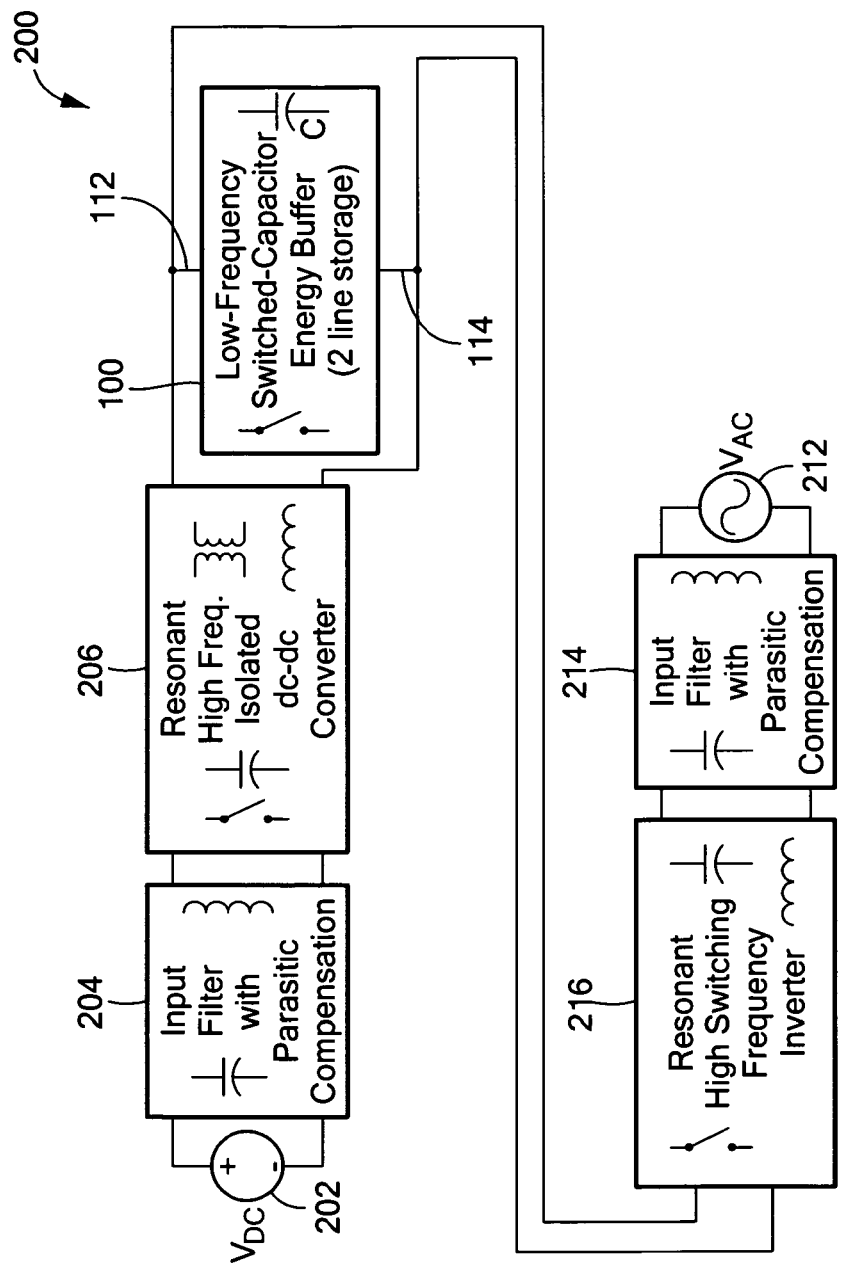
FIG. 3 is a block diagram of a grid interface power converter system using the SSC energy buffer circuit of FIG. 2.

Referring to FIG. 3, the SSC energy buffer circuit 100 may be included into a grid interface power converter system 200. The system 200 includes a DC power source 202 coupled to an input filter with parasitic compensation 204, a resonant high frequency isolated DC-DC converter 206 coupled to the SSC energy buffer circuit 100 through the terminals 112, 114 that provide the bus voltage, $V_{bus}$. The system 200 also includes an AC power source 212 coupled to an input filter with parasitic compensation 214, a resonant high frequency inverter 216 coupled to the SSC energy buffer circuit 100 through the terminals 112, 114. This energy buffering approach is applicable to a wide range of grid-interface power electronic applications (including photovoltaic inverters, motor drives, power supplies, off-line LED drivers and plug-in hybrid electric vehicle chargers and so forth), enabling improved reliability and lifetime in these applications.

Figure 3A:
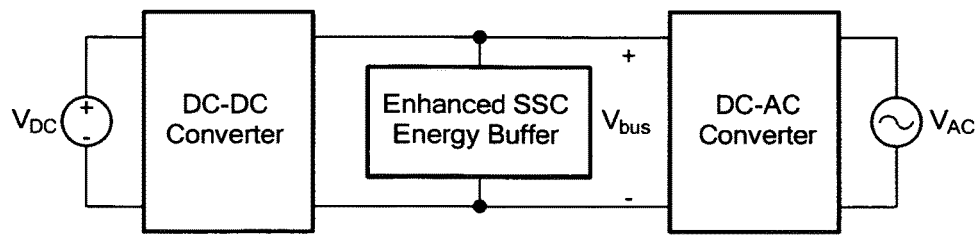
FIG. 3A is a block diagram of a general grid interface power converter system using the SSC energy buffer circuit of FIG. 2.

Referring to FIG. 3A, a grid interface power converter includes a DC-DC converter having a first port adapted to connect to a DC source or load. The grid interface power converter further includes a DC-AC converter having a first port coupled to a second port of the DC-DC converter and having a second port adapted to connect to an AC source or load. The grid interface power converter further comprises a stacked switched capacitor (SSC) energy buffer circuit coupled between the second port of the DC-DC converter and the first port of the DC-AC converter. By appropriately modifying switch states of the SSC energy buffer circuit, the SSC energy buffer circuit absorbs and delivers energy over a wide individual capacitor voltage range, while maintaining a narrow-range voltage at the input port. This enables relatively high utilization, and in some cases maximal utilization, of the energy storage capability Referring to FIG. 4, one particular example of the SSC energy buffer circuit 100 is a circuit 300 called a 2-4 bipolar SSC energy buffer circuit. The circuit 300 includes a first set of circuitry 302 and a second set of circuitry 304 in series with the first set of circuitry 302. The first set of circuitry 302 includes four "legs" each of which comprise four switches $S_{21}, S_{22}, S_{23}, S_{24}$ series coupled with respective ones of four capacitors $C_{21}, C_{22}, C_{23}, C_{24}$ (e.g., the switch $S_{21}$ is in series with the capacitor $C_{21}$, the switch $S_{22}$ is in series with the capacitor $C_{22}$, the switch $S_{23}$ is in series with the capacitor $C_{23}$, and the switch $S_{24}$ is in series with the capacitor $C_{24}$ and so forth). The capacitors $C_{21}, C_{22}, C_{23}, C_{24}$ can be in the circuit 300 in a positive or a negative manner (hence the term "bipolar").

The first circuitry 302 also includes switches $S_{h2}, S_{h1}, S_{h3}$, $S_{h4}$ (sometimes referred herein collectively as an H-bridge) and selectively opening and closing the switches allows for bi-polar charging. The second set of circuitry 304 includes two capacitors $C_{11}, C_{12}$ and two switches $S_{11}, S_{12}$ serially coupled to a respective one of the two capacitors $C_{11}, C_{12}$ (e.g., the switch $S_{11}$ is in series with the capacitor $C_{11}$ and the switch $S_{12}$ is in series with the capacitor $C_{12}$). The circuit 300 also includes a terminal 312 and a terminal 314 that collectively form a buffer port to provide the bus voltage, $V_{bus}$.

The capacitors $C_{11}, C_{12}, C_{21}, C_{22}, C_{23}, C_{24}$ have corresponding voltages $V_{11}, V_{12}, V_{21}, V_{22}, V_{23}, V_{24}$ respectively. The capacitors $C_{11}, C_{12}, C_{21}, C_{22}, C_{23}, C_{24}$ have identical capacitance, but different voltage ratings. For example, the capacitors, $C_{11}$, $C_{12}$ each have a voltage rating of 13/8 $V_{nom}$, where $V_{nom}$ is the nominal value of the bus voltage, $V_{bus}$. The voltage rating of the capacitors $C_{21}$, $C_{22}$, $C_{23}$, $C_{24}$ are 5/8 $V_{nom}$, 4/8 $V_{nom}$, 3/8 $V_{nom}$, and 2/8 $V_{nom}$, respectively. Pre-charging circuitry (not shown in FIG. 4) ensures that the following initial voltages $V_{11}$, $V_{12}$, $V_{21}$, $V_{22}$, $V_{23}$, $V_{24}$ for the capacitors $C_{11}$, $C_{12}$, $C_{21}$, $C_{22}$, $C_{23}$, $C_{24}$ are 3/8 $V_{nom}$, 3/8 $V_{nom}$, 4/8 $V_{nom}$, 3/8 $V_{nom}$, 2/8 $V_{nom}$, and 1/8 $V_{nom}$, respectively.

Figure 5:
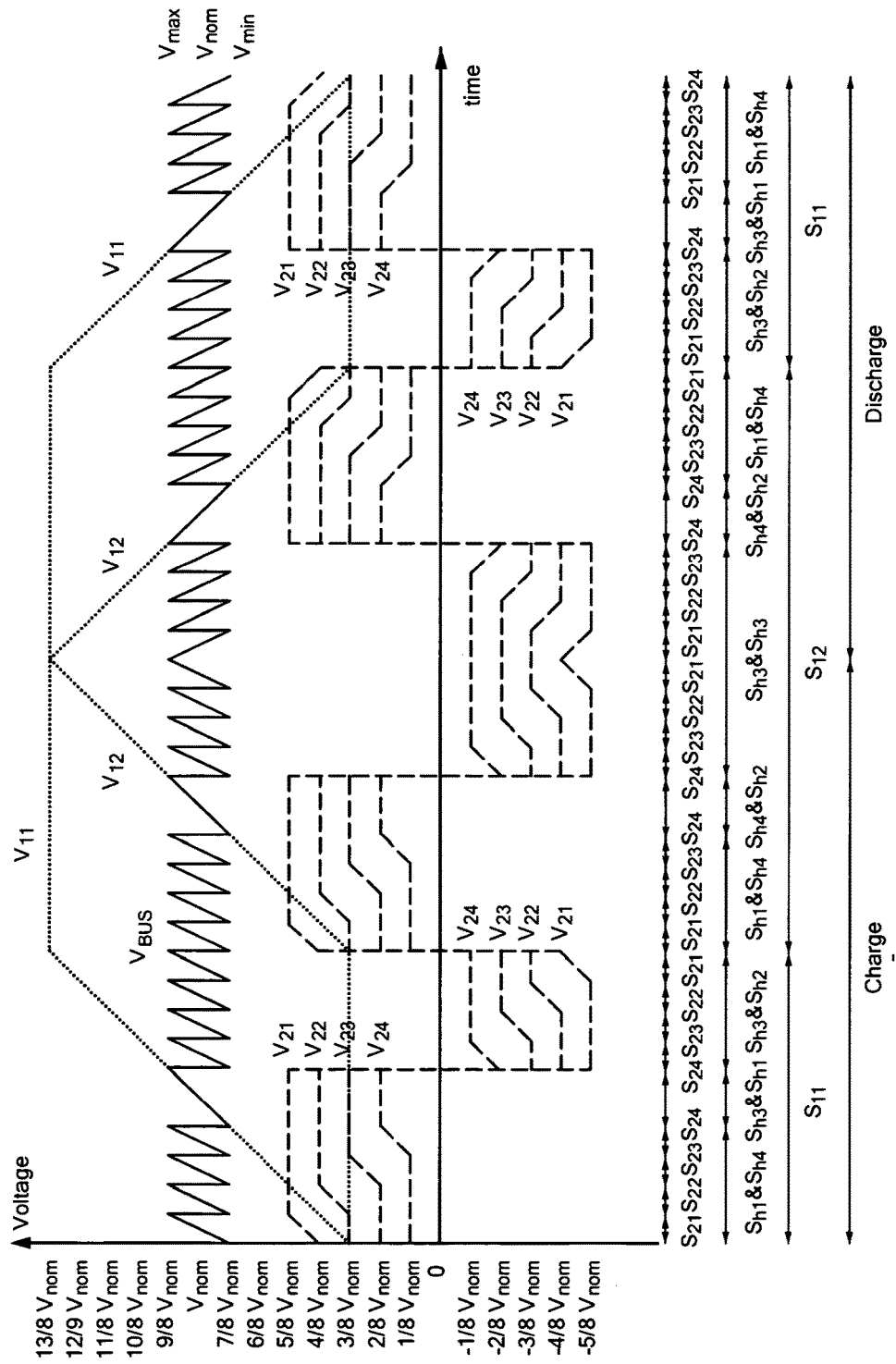
FIG. 5 is a plot of switch states vs. voltages of the circuit in FIG. 4.

Referring to FIG. 5, when the circuit 300 begins charging from its minimum state of charge, switches $S_{h1}$, $S_{h4}$, $S_{21}$, $S_{11}$ are turned on while switches $S_{h2}$, $S_{h3}$, $S_{12}$, $S_{22}$, $S_{23}$, $S_{24}$ are turned off. In the minimum state of charge, the capacitors $C_{11}$, $C_{21}$ are connected in series and charged until the bus voltage, $V_{bus}$, rises from 7/8 $V_{nom}$ to 9/8 $V_{nom}$. At this instant, the voltage, $V_{21}$, of the capacitor $C_{21}$ reaches 5/8 $V_{nom}$ and the voltage, $V_{11}$, of the capacitor $C_{11}$ reaches 4/8 $V_{nom}$.

Then, the switch $S_{21}$ is turned off, the switch $S_{22}$ is turned on; and the bus voltage, $V_{bus}$, drops back down to 7/8 $V_{nom}$. After a similar period of time (assuming a constant charging current) the voltage, $V_{22}$, of the capacitor $C_{22}$ reaches 4/8 $V_{nom}$ and the voltage, $V_{11}$, of the capacitor $C_{11}$ reaches 5/8 $V_{nom}$ and the bus voltage, $V_{bus}$, again reaches 9/8 $V_{nom}$.

Next, the switch $S_{22}$ is turned off, the switch $S_{23}$ is turned on and the capacitor $C_{23}$ is charged. This process is repeated until the capacitor $C_{24}$ is charged. At this point, the capacitor voltages $V_{11}$, $V_{12}$, $V_{21}$, $V_{22}$, $V_{23}$, and $V_{24}$, are 7/8 $V_{nom}$; 3/8 $V_{nom}$; 5/8 $V_{nom}$; 4/8 $V_{nom}$; 3/8 $V_{nom}$; and 2/8 $V_{nom}$, respectively. The bus voltage, $V_{bus}$, is 9/8 $V_{nom}$.

Next, the capacitor $C_{11}$ is charged directly through the switches $S_{h3}$, $S_{h4}$, $S_{11}$ (with all other switches $S_{h1}$, $S_{h1}$, $S_{12}$, $S_{21}$, $S_{22}$, $S_{23}$, $S_{24}$ off) until the voltage, $V_{11}$, and the bus voltage, $V_{bus}$, reach 9/8 $V_{nom}$. Now, the switch $S_{h4}$ is turned off, and the switch $S_{h2}$ is turned on along with the switch $S_{h3}$. Hence, the bus voltage, $V_{bus}$, again drops to 7/8 $V_{nom}$.

Now, the capacitor $C_{11}$ can continue to charge up through the now negatively connected capacitors $C_{21}$, $C_{22}$, $C_{23}$, $C_{24}$ through a process similar to the one described above, except that the capacitors $C_{21}$, $C_{22}$, $C_{23}$, $C_{24}$ are discharged in reverse order, i.e., first through $C_{24}$, then through $C_{23}$, and so on until finally through $C_{21}$.

At this instant, the capacitor $C_{11}$ is fully charged to 13/8 $V_{nom}$ and charging of the capacitor $C_{12}$ must begin. For this, the H-bridge switches are toggled (i.e., the switches $S_{h2}$ and $S_{h3}$ are turned off, and the switches $S_{h1}$ and $S_{h4}$ are turned on), the switch $S_{11}$ is turned of and the switch $S_{12}$ is turned on. The charging process for the capacitor $C_{12}$ is identical to the charging process for the capacitor $C_{11}$. The switch states, the capacitor voltages (as seen from a port outside the H-bridge, e.g. terminals 312 and 313 between sub-circuit 302 and sub-circuit 304) and the resulting bus voltages, $V_{bus}$, over a complete charge and discharge cycle are shown in FIG. 5.

During the discharge period, the capacitors $C_{11}$, $C_{12}$ are discharged one at a time through a process that is the reverse of the charging process. Hence, the voltage waveforms during the discharge period are a mirror of those in the charging period. Throughout the charging and discharging period of the circuit 300, the bus voltage, $V_{bus}$, stays within the 7/8 $V_{nom}$ to 9/8 $V_{nom}$ range. Hence, the circuit 300 has a (nominal to peak) voltage ripple of 12.5%.

It is meaningful to compare various energy buffering circuits in terms of their energy buffering ratio, $\gamma_b$. An energy buffering ratio, $\gamma_b$, is a measure of how effectively a circuit makes use of the total energy storage capacity of its capacitors, $E_{rated}$. It is defined as the ratio of the energy that can be extracted in one cycle to $E_{rated}$. If an energy buffering architecture can be charged up to a maximum energy of $E_{max}$ and drained down to a minimum energy of $E_{min}$, then the energy buffering ratio, $\gamma_b$, is given by:

$$\gamma_b = (E_{max} - E_{min})/(E_{rated})$$

The exemplary circuit 300 achieves an energy buffering ratio, $\gamma_b$ of 81.6%.

Referring to FIG. 6, another example of the SSC energy buffer 100 is a circuit 400 called a 1-3 unipolar SSC energy buffer circuit. The circuit 400 includes a first set of circuitry 402 and a second set of circuitry 404. The first set of circuitry 402 includes switches $S_{21}$, $S_{22}$, $S_{23}$ connected in series to capacitors $C_{21}$, $C_{22}$, $C_{23}$, respectively, and these "legs" (switches in series with capacitors) are connected in parallel. The first set of circuitry 402 also includes a switch $S_{11}$ coupled in parallel to the capacitor switch pairs $C_{21}$-$S_{21}$, $C_{22}$-$S_{22}$ and $C_{23}$-$S_{23}$. The second set of circuitry 404 includes a capacitor $C_{11}$.

The capacitors $C_{11}$, $C_{21}$, $C_{22}$, $C_{23}$ have corresponding voltages $V_{11}$, $V_{21}$, $V_{22}$, and $V_{23}$, respectively. The capacitors $C_{11}$, $C_{21}$, $C_{22}$, $C_{23}$ have identical capacitance, but different voltage ratings: 9/8 $V_{nom}$ for $C_{11}$, 4/8 $V_{nom}$ for $C_{21}$, 3/8 $V_{nom}$ for $C_{22}$ and 2/8 $V_{nom}$ for $C_{23}$, where $V_{nom}$ is the nominal value of the bus voltage, $V_{bus}$. Most of the energy is buffered by the capacitor $C_{11}$, which also supports most of the voltage, while the capacitors $C_{21}$, $C_{22}$ and $C_{23}$ play a supportive function, by buffering a small amount of energy and providing some voltage support.

Figure 7:
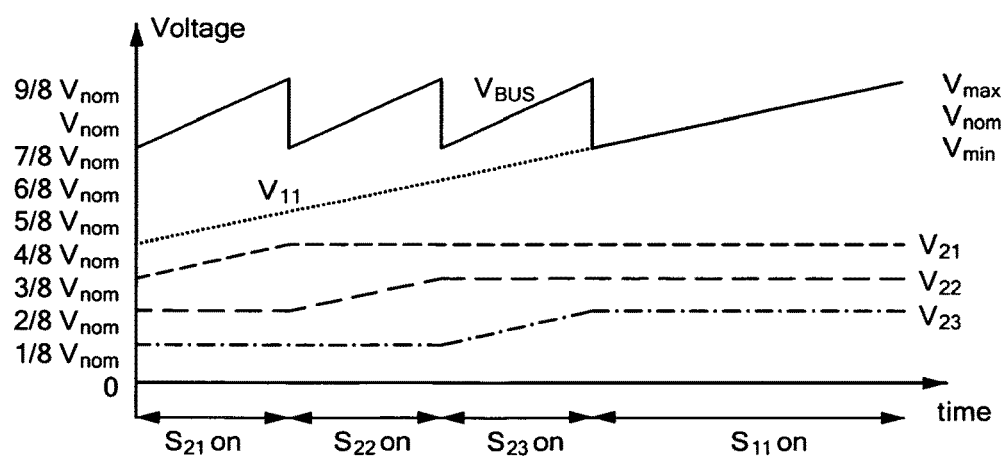
FIG. 7 is a plot of switch states vs. voltages of the circuit in FIG. 6.

FIG. 7 depicts the voltage waveforms for the capacitors $C_{11}$, $C_{21}$, $C_{22}$, $C_{23}$ during a charging period for the circuit 400. Pre-charging circuitry (not shown in FIG. 6) ensures that each of capacitors $C_{11}$, $C_{21}$, $C_{22}$, $C_{23}$ are charged to respective ones of the following initial voltages $V_{11}$, $V_{21}$, $V_{22}$ and $V_{23}$ In one embodiment, the initial voltages $V_{11}$, $V_{21}$, $V_{22}$, $V_{23}$ correspond to voltages of 4/8 $V_{nom}$; 3/8 $V_{nom}$; 2/8 $V_{nom}$; and 1/8 $V_{nom}$. Once the circuit 400 starts to charge, the switch $S_{21}$ is turned on and the other switches $S_{22}$, $S_{23}$ and $S_{11}$ are turned off. In this case, the capacitors $C_{11}$, $C_{21}$ are placed in series with each other and charged until the bus voltage, $V_{bus}$, reaches 9/8 $V_{nom}$, when the voltage, $V_{21}$, reaches 4/8 $V_{nom}$, and the voltage, $V_{11}$, reaches 5/8 $V_{nom}$. Then, the switch $S_{21}$ is turned off, the switch $S_{22}$ is turned on. After a next period of time (which may be the same as or similar to the period of time taken to charge caps $C_{11}$, $C_{21}$ assuming a constant charging current), the voltage, $V_{22}$, reaches 3/8 $V_{nom}$ and the voltage, $V_{11}$ reaches 6/8 $V_{nom}$. Then, the switch $S_{23}$ is turned on and the capacitor $C_{23}$ is charged. In this way, switches $S_{21}$, $S_{22}$, $S_{23}$, $S_{11}$ are turned on and off one after another and the voltages $V_{21}$, $V_{22}$, $V_{23}$, $V_{11}$ finally reach the voltage values 4/8 $V_{nom}$, 3/8 $V_{nom}$, 2/8 $V_{nom}$ and 9/8 $V_{nom}$, respectively. Then, the circuit 400 enters the discharging period. The switches are turned on and off in reverse order in the discharge cycle. Hence, the voltage waveforms during the discharging period are the reverse of those in the charging period (not shown in FIG. 7).

Thus, by changing the switch configurations appropriately as energy is delivered to and from the buffer port, individual capacitors can be charged/discharged over a wide range (from their initial voltages to rated voltages), while the voltage at the buffer port, $V_{bus}$, is maintained within a narrow range (within ±12.5% def $V_{nom}$) as shown in FIG. 7. It can be shown that this simple structure can provide energy buffering of up to 8/11 (~72.7%) of the peak energy storage rating of the capacitors, while providing a buffer port voltage, $V_{bus}$, that remains within ±12.5% of a nominal bus voltage, $V_{nom}$.

Figure 8:
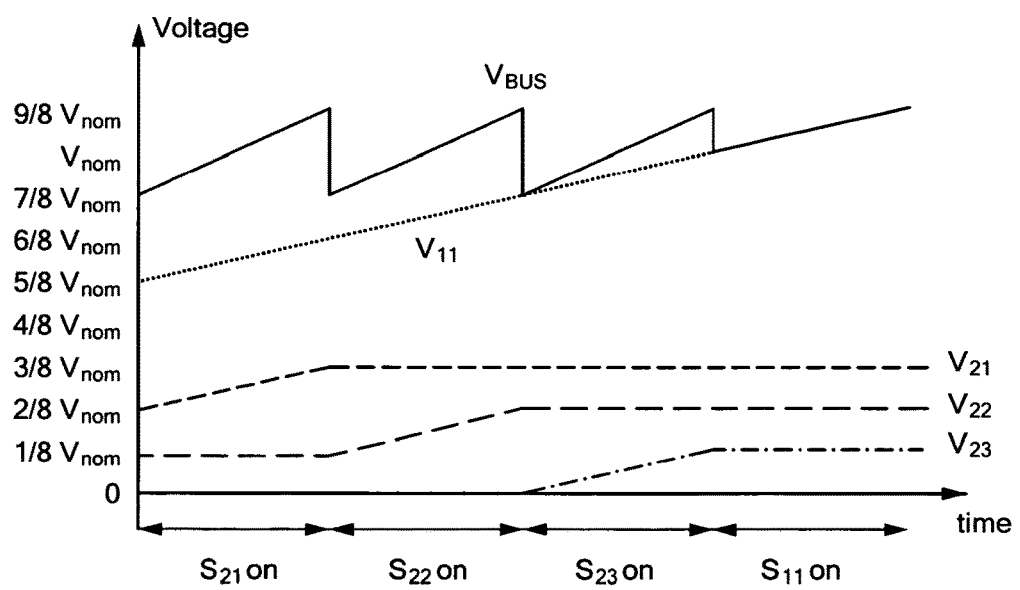
FIG. 8 is a plot of switch states vs. voltages of the circuit in FIG. 6 using a modified control.

Referring to FIG. 8, the circuit 400 can also be operated in slightly different manner. For example, unlike the control strategy depicted in FIG. 7, a different control strategy gives equal time to all four switch states. The required voltage rating of the capacitors $C_{21}$, $C_{22}$, $C_{23}$ is lower than in FIG. 7. However, with this modification the energy buffering ratio of the buffer reduces to 68.4% compared to 72.7% depicted in FIG. 7.

Figure 9:
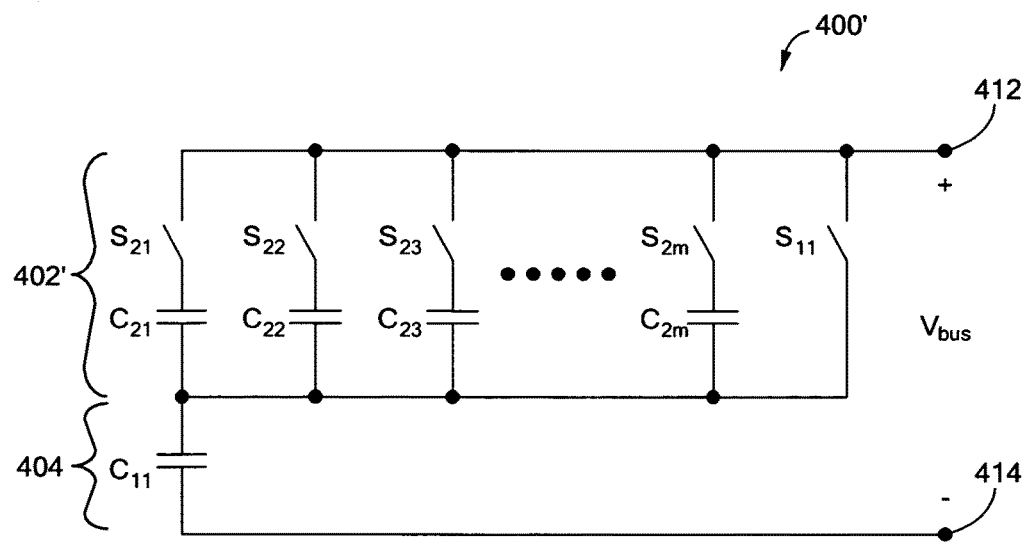
FIG. 9 is a circuit diagram of a generalized example of the SSC energy buffer circuit of FIG. 6 called a 1-m unipolar SSC energy buffer circuit.

Referring to FIG. 9, the circuit 400 can be extended to achieve a smaller bus voltage, $V_{bus}$, variation or a higher energy buffering ratio, $\gamma_b$, by adding more capacitors in parallel to the three upper capacitors, $C_{21}$, $C_{22}$, $C_{23}$, shown in the circuit 400 (FIG. 6). For example, a circuit 400' called a 1-m unipolar SSC energy buffer circuit includes a first set of circuitry 402' and the second set of circuitry 404 which includes the capacitor $C_{11}$ similar to the circuit 400. However, the first set of circuitry 402' includes additional switches and capacitors than the first set of circuitry 402 in the circuit 400. For example, the first set of circuitry 402 includes m "legs" in parallel (each "leg" consisting of a switch in series with a capacitor), m switches in series with the m capacitors and the switch $S_{11}$ in parallel with the m "legs". Each of the m capacitors have equal capacitance. The energy buffering ratio for the circuit 400' is given by:

$$\gamma_b = \frac{[(1+R_v)^2 - (1-mR_v)^2]C_1 + (mR_v)^2}{C_1(1+R_v)^2 + C_2(1+2^2+\ldots+m^2)R_v^2}$$

where $R_v$ is the voltage ripple ratio ($=0.5(V_{max}-V_{min})/V_{nom}$, $C_1$ is the capacitance of the capacitor $C_{11}$ and $C_2$ is the capacitance of one of the m capacitors each (which have equal capacitance).

Figure 10:
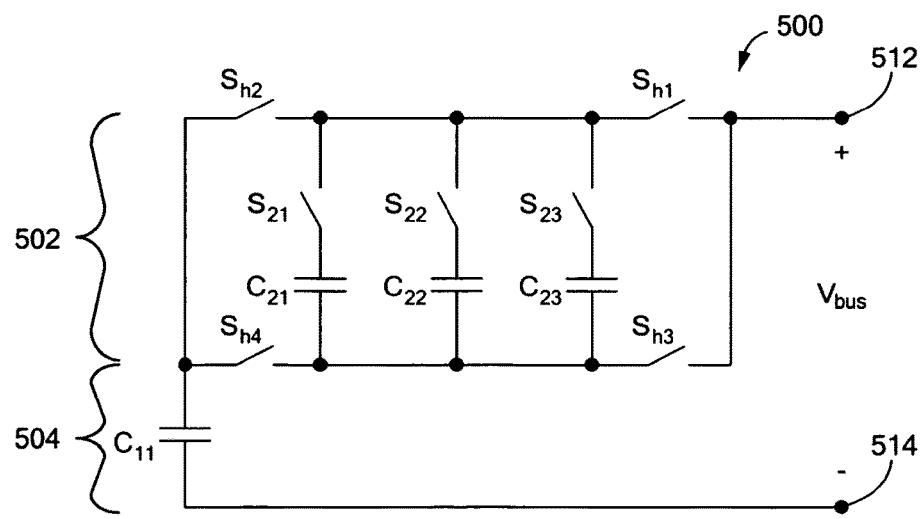
FIG. 10 is a circuit diagram of an example of the SSC energy buffer circuit of FIG. 2 called a 1-3 bipolar SSC energy buffer circuit.

Referring to FIG. 10, another type of SSC energy buffer circuit is a circuit 500 called a 1-3 bipolar SSC energy buffer circuit. Film capacitors are bipolar and can be charged in either direction. The circuit 500 takes advantage of this fact and thus improves the topology and operating strategy in order to push the energy buffering ratio, $\gamma_b$, even higher.

The circuit 500 includes a first set of circuitry 502 and a second set of circuitry 504. The first set of circuitry 502 includes 3 "legs" parallel and switches $S_{21}$, $S_{22}$ and $S_{23}$ in series with a respective one capacitor $C_{21}$, $C_{22}$, $C_{23}$, each set forming one leg. The first set of circuitry 502 also includes switches $S_{h1}$, $S_{h2}$, $S_{h3}$, $S_{h4}$ (e.g., an H-bridge). The second set of circuitry 504 includes a capacitor, $C_{11}$. The capacitors $C_{11}$, $C_{21}$, $C_{22}$, $C_{23}$ have identical capacitance values. The voltage ratings for the capacitors $C_{11}$, $C_{21}$, $C_{22}$, $C_{23}$ are 11/8 $V_{nom}$, 3/8 $V_{nom}$, 2/8 $V_{nom}$ and 1/8 $V_{nom}$, and respectively. The main difference of this topology compared to unipolar one is that the four supporting capacitors are now put info the H-bridge to enable bi-directional charging. For operating strategy, pre-charging circuitry (not shown) ensures that specified initial voltages are placed on the capacitors $C_{11}$, $C_{21}$, $C_{22}$, $C_{23}$ are 5/8 $V_{nom}$, 2/8 $V_{nom}$, 1/8 $V_{nom}$, 0 respectively. At first, switches $S_{h1}$ and $S_{h4}$ are turned on and switches $S_{h2}$ and $S_{h3}$ are turned off. Then the circuit 500 operates as a unipolar buffer as described above with the voltage of the four capacitors $C_{11}$, $C_{21}$, $C_{22}$, $C_{23}$ reaches 3/8 $V_{nom}$, 2/8 $V_{nom}$, 1/8 $V_{nom}$, and $V_{nom}$, respectively. At this time, the switches $S_{h1}$ and $S_{h4}$ are turned off and the switches $S_{h2}$ and $S_{h3}$ are turned on, thus the voltages of the capacitors $C_{21}$, $C_{22}$, $C_{23}$ seen from the outside are reversed to -3/8 $V_{nom}$, -2/8 $V_{nom}$ and -1/8 $V_{nom}$, while the voltage of the capacitor, $C_{11}$, stays the same. After a similar process, the capacitors $C_{21}$, $C_{22}$, $C_{23}$ are charged back to -2/8 $V_{nom}$, -1/8 $V_{nom}$ and 0, respectively with the voltage of $C_{11}$ charged up to 11/8 $V_{nom}$.

After this, the discharging process begins and the capacitors $C_{21}$, $C_{22}$, $C_{23}$ are discharged down, flipped to a positive position and then discharged again while $C_{11}$ is all the way discharged back to 5/8 $V_{nom}$.

Figure 11:
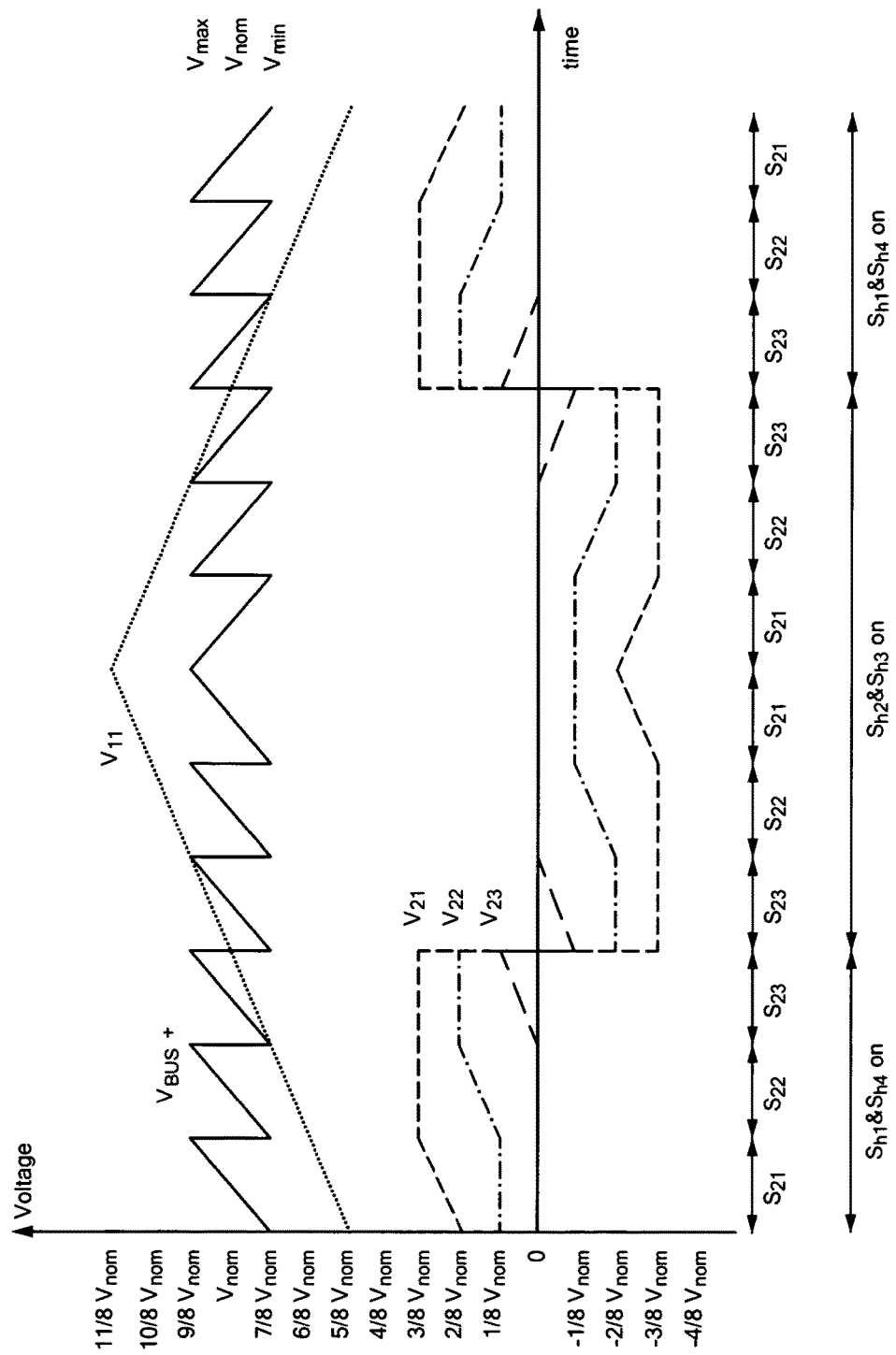
FIG. 11 is a plot of switch states vs. voltages of the circuit in FIG. 10.

Referring to FIG. 11, the waveforms of the voltage of each capacitor during a charging period are shown. As described above, by changing the switch configurations appropriately as energy is delivered to and from the buffer port, the individual capacitors can charge over a wide range (from their initial voltages to rated voltages), while the voltage at the buffer port is maintained within a narrow range (within 12.5% of $V_{nom}$). It can be shown that circuit 500 provides energy buffering of 71.1% of the peak energy storage rating of the capacitors, while providing a buffer port voltage, $V_{bus}$, that remains within ±12.5% of a nominal bus voltage, $V_{nom}$. While the energy buffering ratio, $\gamma_b$, of the circuit 500 is lower than that of the circuit 400 (i.e., 1-3 unipolar SSC energy buffer), the bipolar SSC energy buffer circuit with a slightly modified control and design methodology (as described further herein) increases its energy buffering ratio, $\gamma_b$, to 74%.

Figure 12:
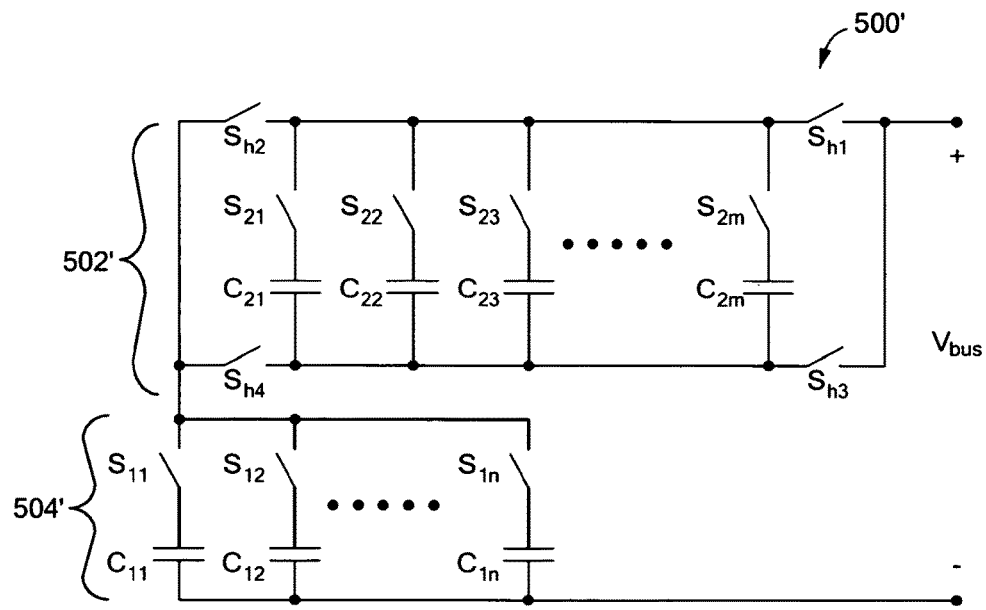
FIG. 12 is a circuit diagram of an example of the SSC energy buffer circuit of FIG. 2 called an n-m bipolar SSC energy buffer circuit.

Referring to FIG. 12, the circuit 500 can be extended by adding more capacitors to the first and second of circuitry, 502, 504 as in a circuit 500' called a n-m bipolar SSC energy buffer circuit. Note that the capacitor that does the energy buffering in the circuit 500 is the capacitor $C_{11}$ in the second set of circuitry 504. Therefore, by replacing C11 alone with a plurality of "legs" in parallel, each "leg" comprising the series connection of a capacitor and switch, better buffering performance can be achieved.

The circuit 500' includes a first set of circuitry 502' and a second set of circuitry 504'. The first set of circuitry 502' includes capacitors $C_{21}$, $C_{22}$, ..., $C_{2m}$ (referred herein as m capacitors) and switches $S_{21}$, $S_{22}$, ..., $S_{2m}$ in series with a respective one capacitor, and the "legs" formed by each switch capacitor pair in parallel. The first set of circuitry 502' also includes switches $S_{h4}$ (e.g., an H-bridge). The second set of circuitry 504 includes capacitors $C_{11}$, $C_{12}$, ..., $C_{1n}$ (referred herein as n capacitors) and switches $S_{11}$, $S_{12}$, ..., $S_{1n}$ in series with a respective one capacitor, and the "legs" formed by each switch-capacitor pair in parallel.

The m capacitors in the first set of circuitry 502 in this case have to switch at a higher switching frequency. The energy buffering ratio for this n-m bipolar SSC energy buffer (with n capacitors of equal value $C_1$ and m capacitors with equal value $C_2$) is given by:

$$\gamma_b = \frac{nC_1\left[\left(1+2mR_v\frac{C_2}{C_1+C_2}\right)^2 - \left(1-2mR_v\frac{C_2}{C_1+C_2}\right)^2\right]}{nC_1\left[\left(1+2mR_v\frac{C_2}{C_1+C_2}\right)^2 - C_2(1+2^2+\ldots+m^2)R_v^2\right]}$$

Figure 13:
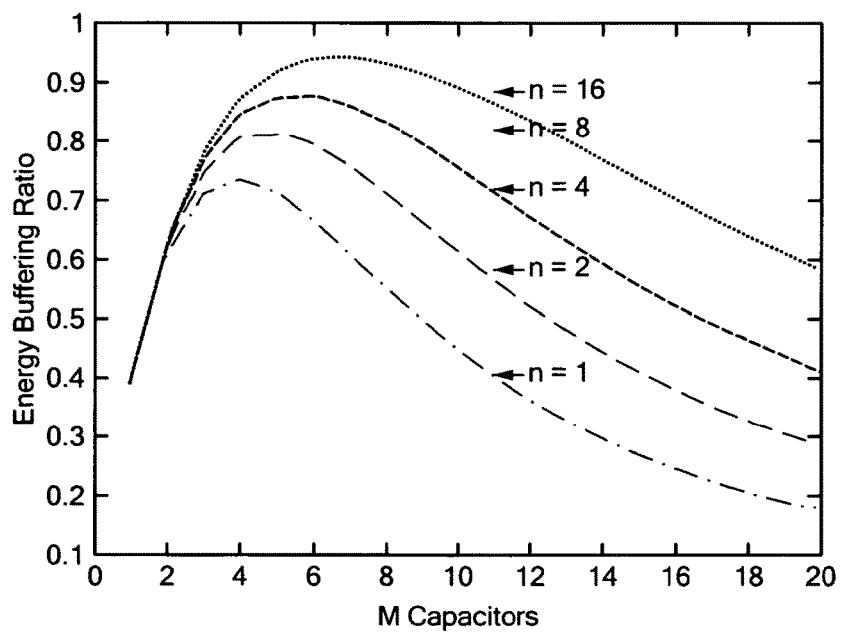
FIG. 13 is a plot of energy buffering ratio versus a number of m capacitors with a voltage ripple ratio of 12.5% for different numbers of n capacitors.

Referring to FIG. 13, the variation in energy buffering ratio, $\gamma_b$, as a function of the number of n capacitors and number of m capacitors is shown. FIG. 13 indicates that there is an optimal number of m capacitors that should be used for a given number of n capacitors in order to maximize the energy buffering ratio, $\gamma_b$. Note that this optimal number of m capacitors depends on the value of allowed voltage ripple ratio, $R_v$. In FIG. 13, the voltage ripple ratio, $R_v$, is 12.5%.

Figure 14A:
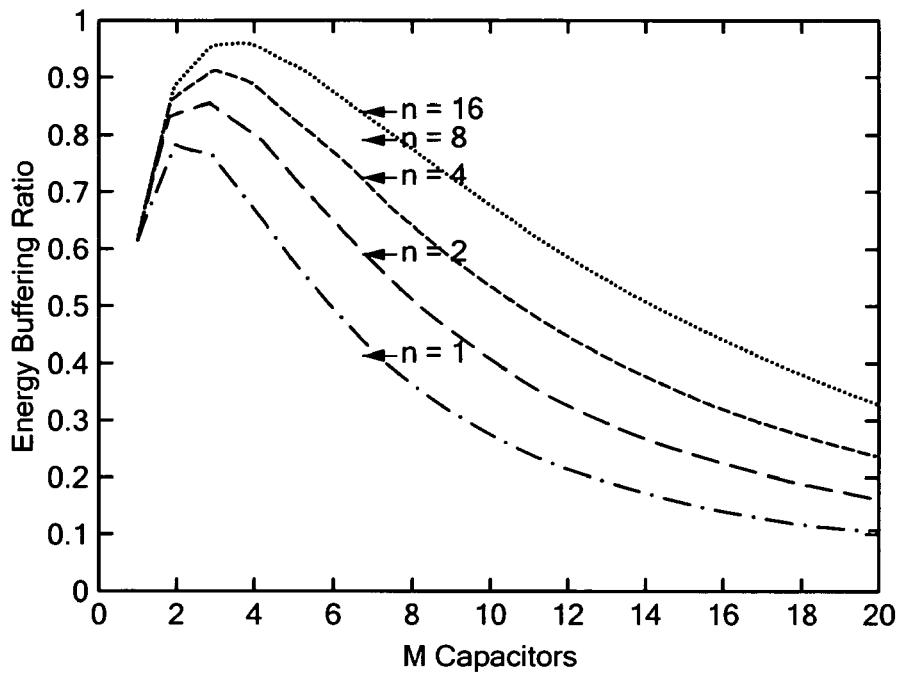
FIG. 14A is a plot of energy buffering ratio versus a number of m capacitors with a voltage ripple ratio of 25% for different numbers of n capacitors.
Figure 14B:
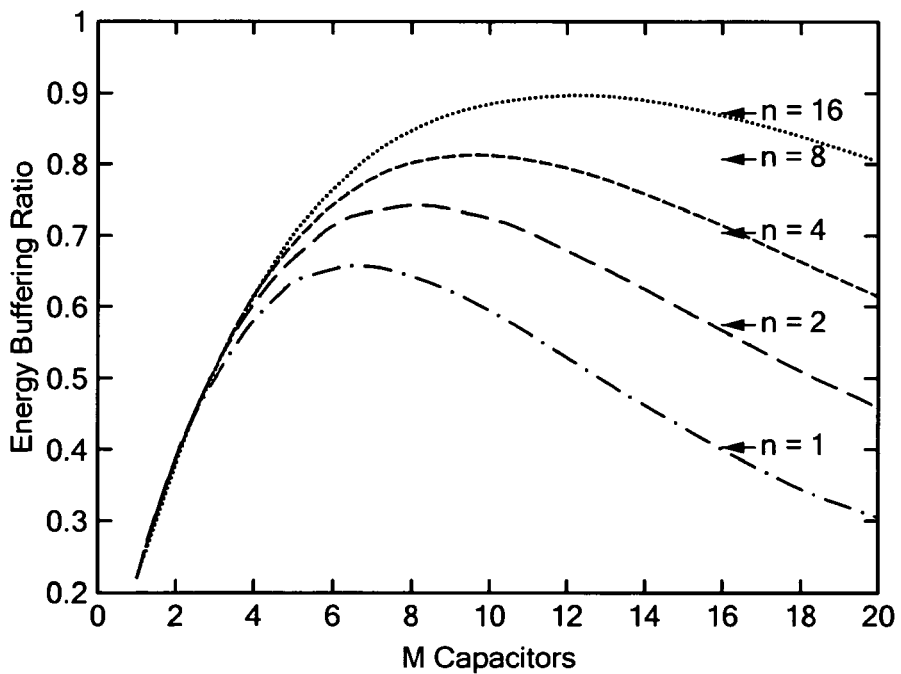
FIG. 14B is a plot of energy buffering ratio versus a number of m capacitors with a voltage ripple ratio of 6.25% for different numbers of n capacitors.

FIGS. 14A and 14B show how the optimal number of m capacitors changes as the allowed voltage ripple ratio, $R_v$, is changed. FIG. 14A has a voltage ripple ration, $R_v$, of 25%. FIG. 14A has a voltage ripple ratio, $R_v$, of 6.25%. If a larger voltage ripple ratio, $R_v$, is allowed a higher energy buffering ratio, $\gamma_b$, can be achieved with fewer m capacitors. On the other hand, a lower voltage ripple, $R_v$, requires a larger number of m capacitors if maximum energy buffering is to be achieved. However, increasing the number of m capacitors also increases the complexity of the circuit. Therefore the number of m capacitors to use can be determined by an appropriate trade-off between voltage variation and energy buffering ratio, $\gamma_b$.

Figure 15:
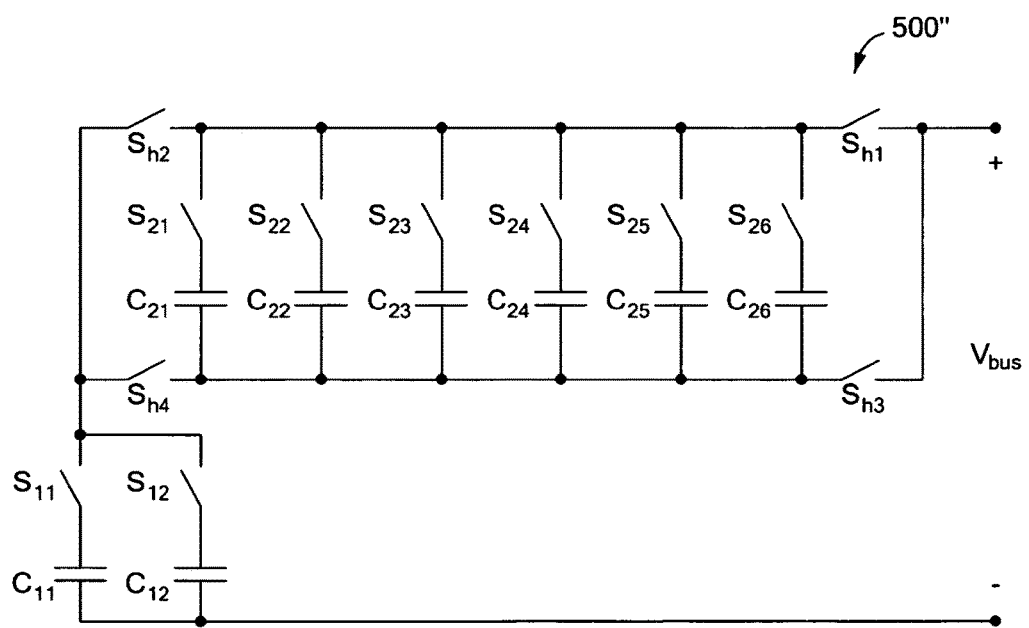
FIG. 15 is a circuit diagram of another example of the SSC energy buffer circuit called a 2-6 bipolar SSC energy buffer circuit.

Referring now to FIG. 15, one particular example of the circuit 500' is a circuit 500' where n=2 and m=6 also called a 2-6 bipolar stacked switched capacitor energy buffer circuit.

Exemplary circuit 500' includes a first block of parallel coupled switches and capacitors S11, C11, S12, C12 and a second block of parallel coupled switches and capacitors S21, C21, S22, C22, S23, C23, S24, C24, S25, C25, S26, C26. The first and second blocks are coupled in series across a bus voltage $V_{bus}$. Switches Sh1, Sh2, Sh3, Sh4 are disposed in the second block to provide selected signal paths between the first and second blocks.

As noted above, the capacitors are preferably of a type that can be efficiently charged and discharged over a wide voltage range (e.g., film capacitors). The switches are disposed to selectively couple the capacitors to enable dynamic reconfiguration of both the interconnection among the capacitors and their connection to a buffer port. The switches are cooperatively operated as a switching network such that the voltage seen at the buffer port varies only over a small range as the capacitors charge and discharge over a wide range to buffer energy.

By appropriately modifying switch states of the SSC energy buffer circuit, the SSC energy buffer circuit absorbs and delivers energy over a wide individual voltage range, while maintaining a narrow-range voltage at the input port. This enables maximal utilization of the energy storage capability.

Figure 16:
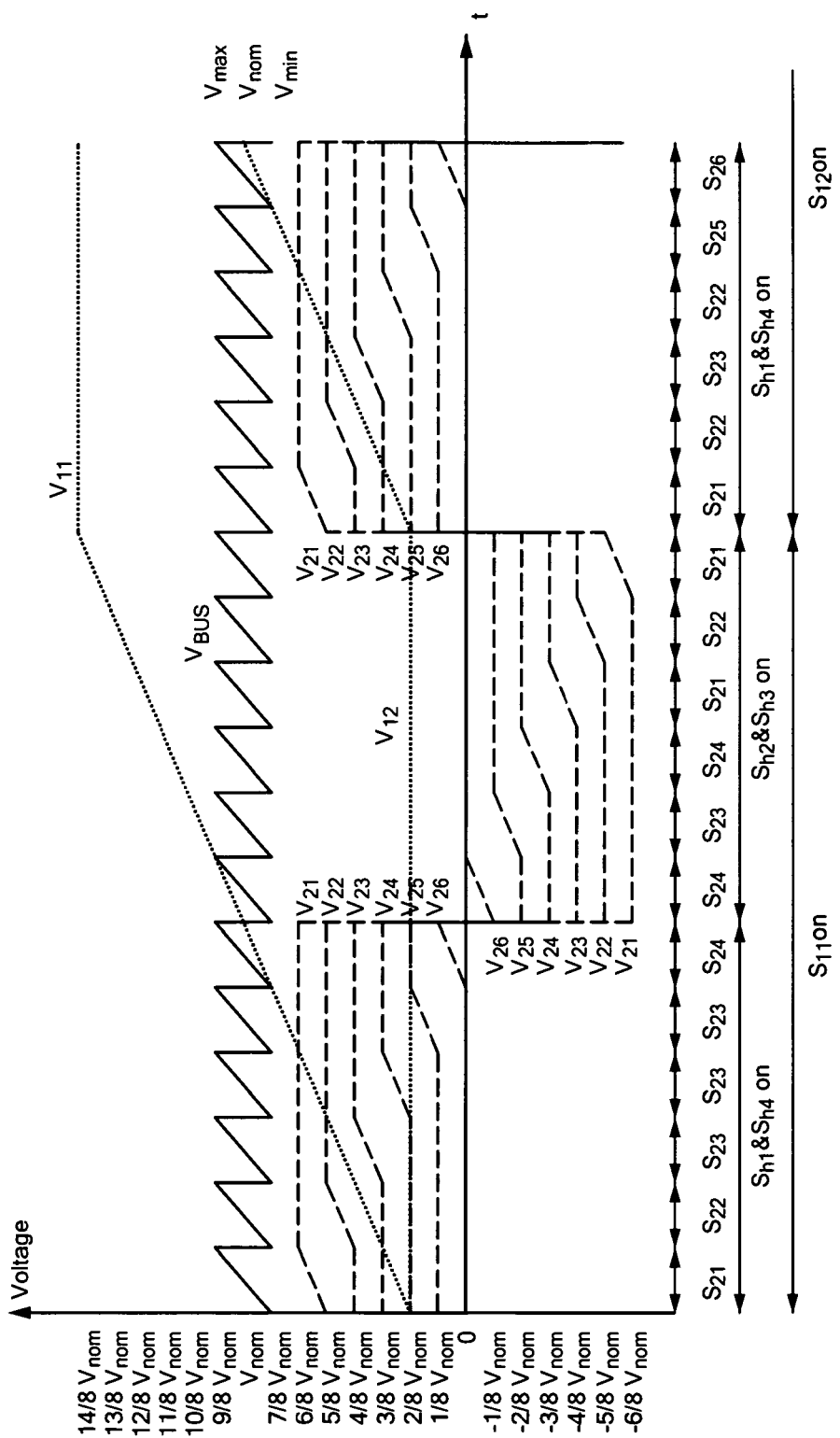
FIG. 16 is a plot of switch states vs. voltages of the circuit in FIG. 15.

The waveforms associated with the circuit 500" are shown in FIG. 16.

Referring now to FIG. 16, a plot of switching states vs. voltage is shown for the circuit 500" (FIG. 15).

The bipolar stacked switched capacitor energy buffer circuit (e.g., the circuit 500') previously described can also be controlled in a slightly different manner. Instead of charging the n capacitors only in series with the m capacitors, a state can be introduced by turning $S_{h3}$ and $S_{h4}$ (or $S_{h1}$ and $S_{h2}$) on at the same time in which the n capacitor is charged directly. An example of the modified control is shown in FIG. 5 for the circuit 300 (the 2-4 bipolar SSC energy buffer circuit) of FIG. 4. The modified control is described herein in the section entitled: "Enhanced Bipolar Stacked Switched Capacitor Energy Buffer"]. With this modified control, and assuming that all m and n capacitors have the same capacitance, the expression for energy buffering ratio, $\gamma_b$, becomes:

$$Y_b = \frac{n[(1+(m+1)R_v)^2 - (1-(m+1)R_v)^2]}{n[(1+(m+1)R_v)^2 - (2^2+3^3+\ldots+(m+1)^2R_v^2)]}$$

Figure 17:
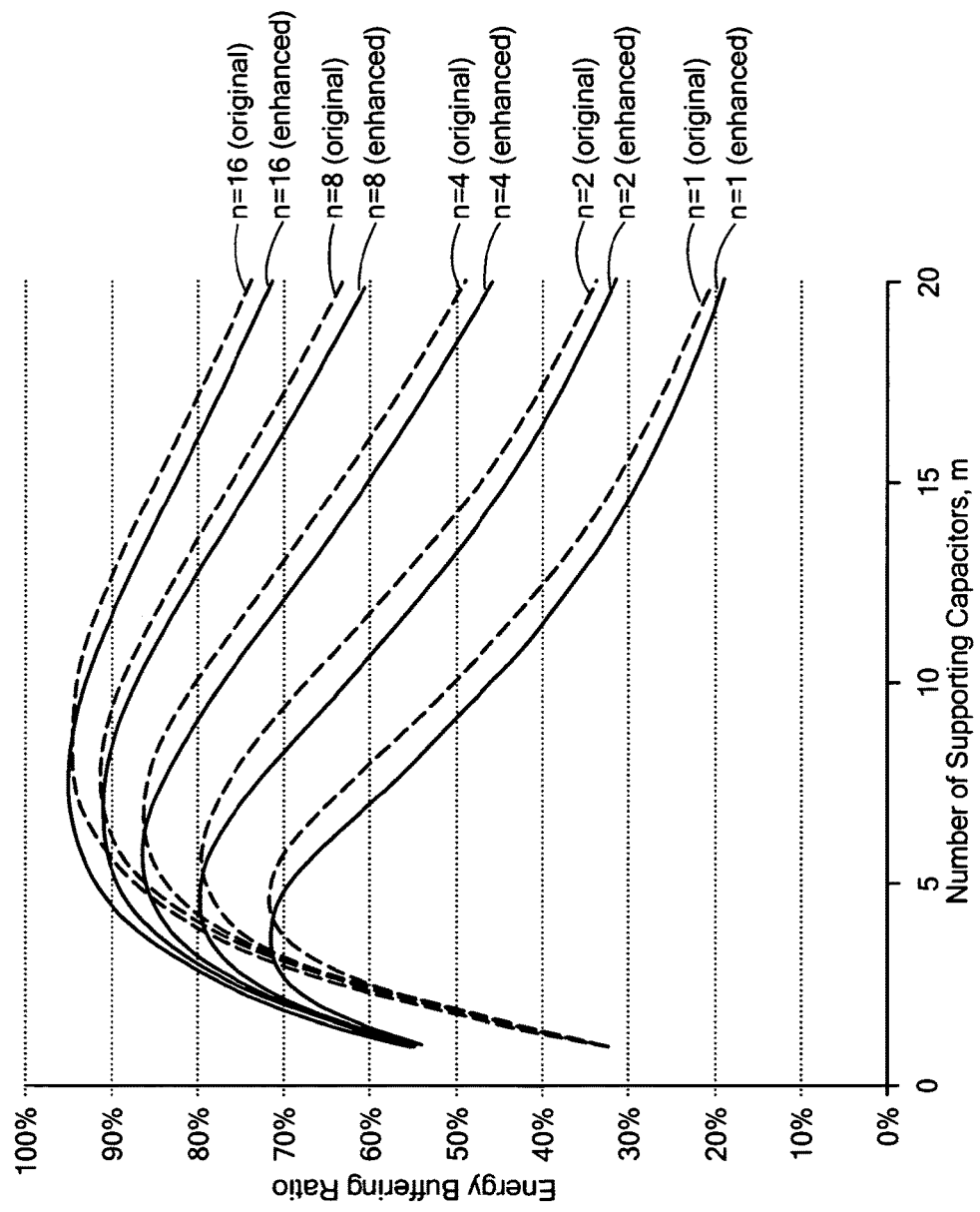
FIG. 17 is a plot of energy buffering ratio versus and the number of m capacitors for different numbers of n capacitors and whether under modified control.

This is plotted as a function of number of n capacitors and number of m capacitors in FIG. 17. FIG. 17 also plots (as dashed lines) the energy buffering ratio without modified control. The modified control achieves higher maximum energy buffering ratio than without the modified control. Furthermore, it achieves this higher maximum with fewer m capacitors than without modified control.

Figure 15A:
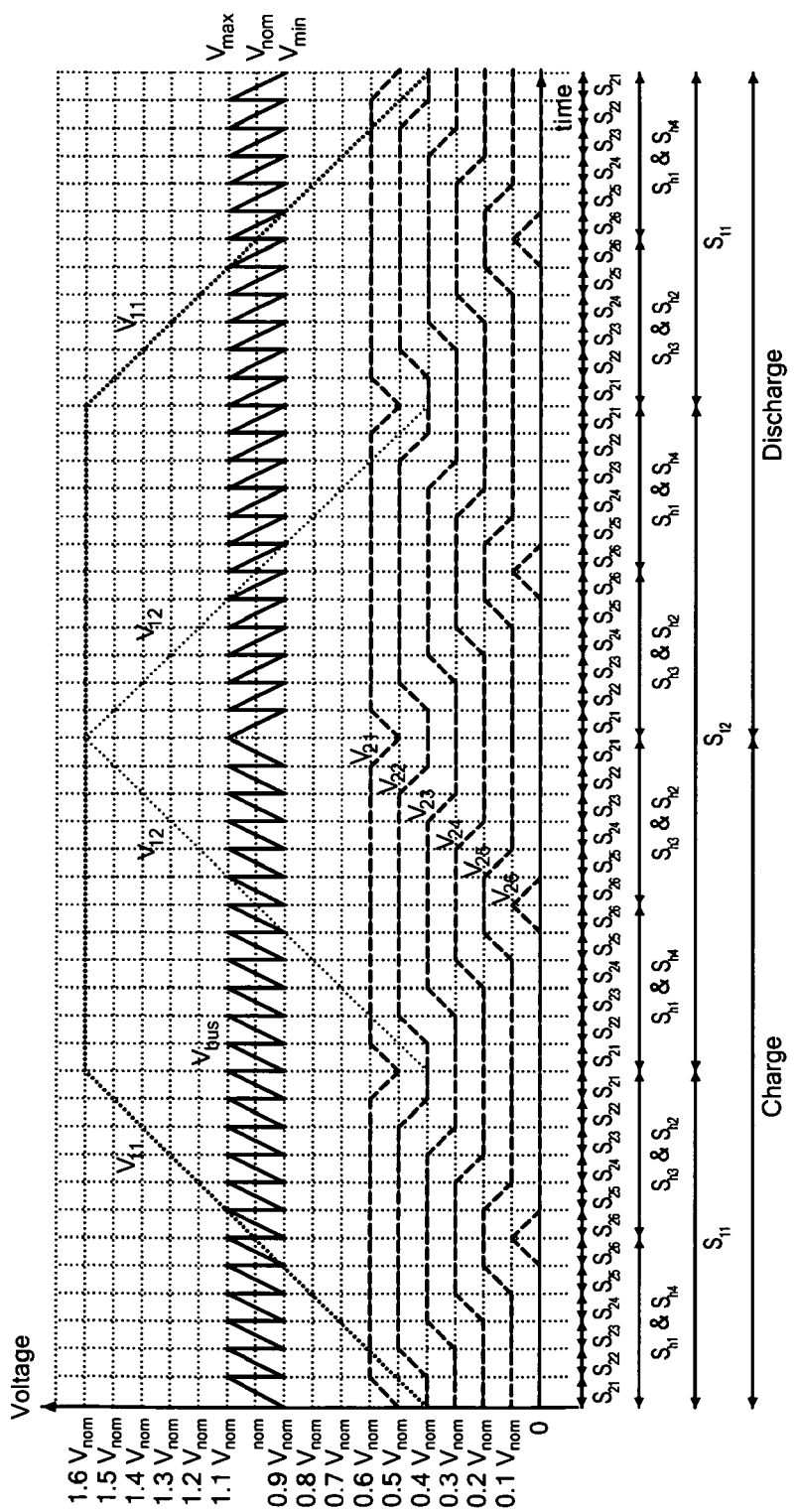
FIG. 15A is a plot of switch states vs. voltages of the circuit in FIG. 15.

As discussed above, an SSC energy buffer has two series coupled blocks comprising capacitors and switches. It works on the principle that while the voltage of individual capacitors and the individual blocks can vary over a wide range, the voltage at the buffer port remains constrained to a desired narrow range by having the voltages of the two blocks compensate for each other. There are many possible implementations of the SSC energy buffer architecture. One implementation known as the n-m bipolar SSC energy buffer is described above in conjunction with FIG. 15 with n and m equal to 2 and 6, respectively. In this design all the capacitors have equal capacitance, but different voltage ratings. Before the buffer starts normal operation the capacitors are precharged to specified initial levels using a pre-charge circuit. During normal operation, the buffer operates as depicted by the switching patterns and associated voltage waveforms shown in FIG. 15A. In each state, one backbone capacitor and one supporting capacitor are connected in series across the buffer port.

Important parameters of a switched capacitor energy buffer are the voltage ripple ratio $R_v$ and the energy buffering ratio $\Gamma_b$. The voltage ripple ratio ($R_v$) is defined as the ratio of the peak voltage ripple amplitude to the nominal value of the voltage. The energy buffering ratio ($\Gamma_b$) is defined as the ratio of the energy that can be injected and extracted from an energy buffer in one cycle to the total energy capacity of the buffer. Maximizing the energy buffering ratio for a given required voltage ripple ratio is desired because one can make better usage of a given amount of capacitor energy storage. A bipolar SSC energy buffer can be designed with any number of "backbone" capacitors in the lower block (n) and any number of "supporting" capacitors in the upper block (m). However, for a given voltage ripple ratio requirement and a given number of backbone capacitors there is an optimal number of supporting capacitors that yields the highest energy buffering ratio, and hence the highest effective energy density for the passive components. The energy buffering ratio ($\Gamma_b$) for an n-m bipolar SSC energy buffer is given by:

$$\Gamma_b = n(1+mR_v)^2 - (1-mR_v)^2/[n(1+mR_v)^2 + (1+2^2+\ldots+m^2)R_v^2] \qquad \text{Eq. (10)}$$

For example, for a 10% bus voltage ripple ratio requirement and with 2 backbone capacitors, the optimal design of a bipolar SSC energy buffer is one with 6 supporting capacitors. This is evident from the plot of FIG. 17.

The n-m bipolar SSC energy buffer can also be controlled in a slightly different manner so as to operate as an enhanced bipolar sac energy buffer. Instead of charging the backbone capacitors only in series with the supporting capacitors, a state can be introduced by turning $S_{h3}$ and $S_{h4}$ (or $S_{h1}$ and $S_{h2}$) on at the same time in which the backbone capacitor is charged directly.

Figure 18:
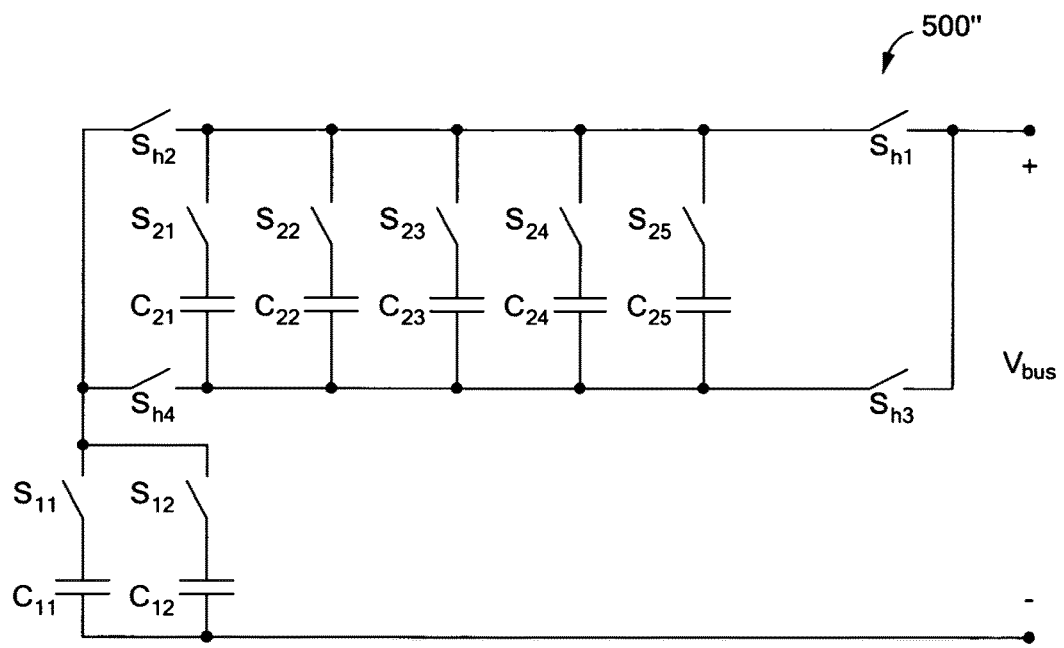
FIG. 18 is a circuit diagram of another example of the SSC energy buffer circuit called a 2-5 bipolar SSC energy buffer circuit.

Referring now to FIG. 18, consider the 2-5 enhanced bipolar SSC energy buffer. Similar to the 2-6 bipolar SSC energy buffer of FIG. 15, the 2-5 enhanced bipolar SSC energy buffer of FIG. 18 is designed for a bus voltage ripple ratio of 10%. Its seven capacitors also have identical capacitance, but different voltage ratings. The pre-charge circuit (not shown in FIG. 15 or 18) ensures that the following initial voltages are placed on the seven capacitors:

$0.4V_{nom}$ on $C_{11}$, $0.4V_{nom}$ on $C_{12}$, $0.5V_{nom}$ on $C_{21}$, $0.4V_{nom}$ on $C_{22}$, $0.3V_{nom}$ on $C_{23}$, $0.2V_{nom}$ on $C_{24}$, and $0.1V_{nom}$ on $C_{25}$.

Figure 18A:
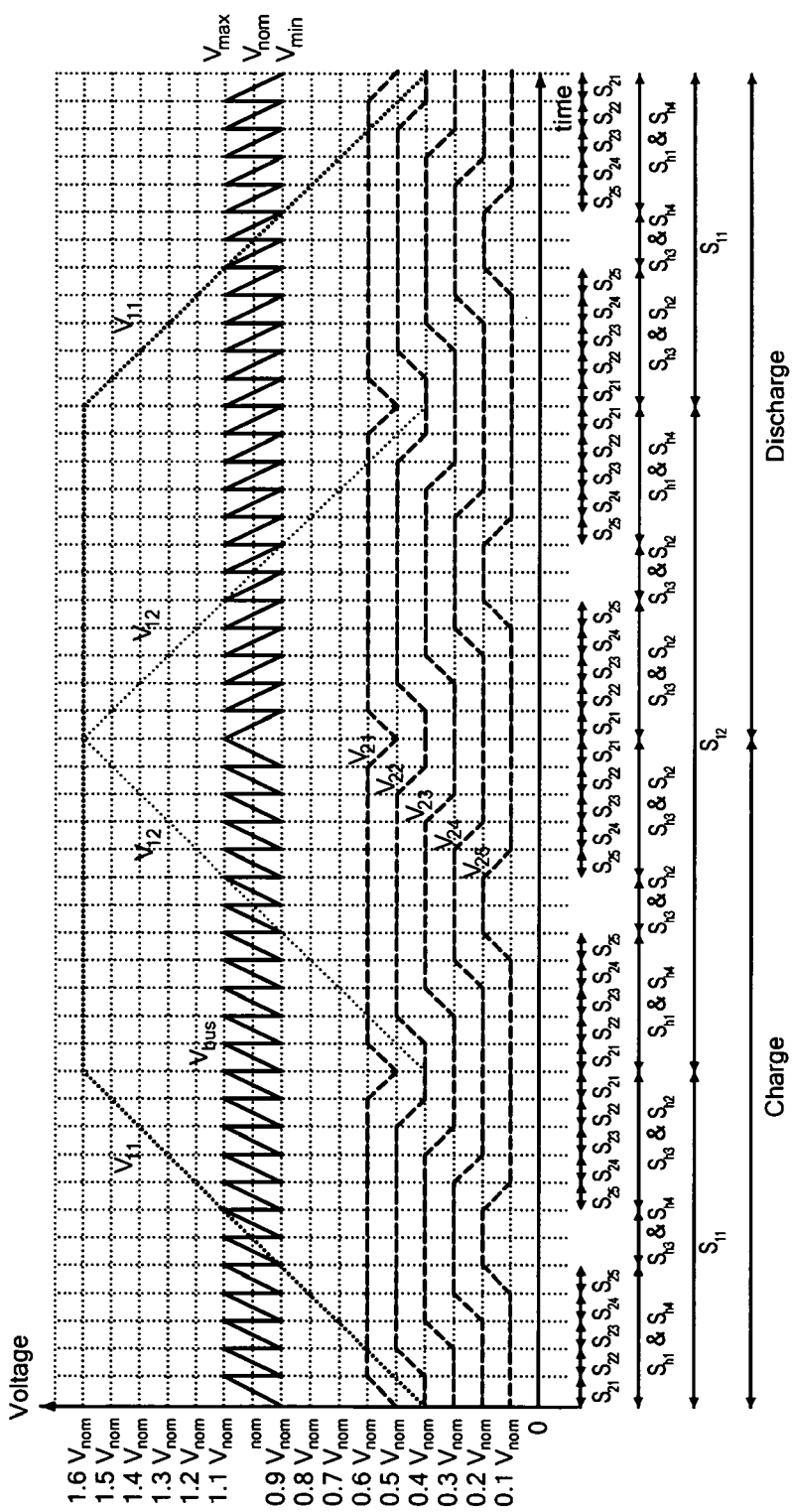
FIG. 18A is a plot of switch states vs. voltages of the circuit in FIG. 18.

When the energy buffer starts charging up from its minimum state of charge (as shown in FIG. 18A, $S_{h1}$, $S_{h4}$, $S_{21}$ and $S_{11}$ are turned on with all the other switches turned off. In this state, $C_{11}$ and $C_{21}$ are connected in series and charged until the bus voltage rises from $0.9V_{nom}$ to $1.1V_{nom}$. At this instant the voltage of $C_{21}$ ($V_{21}$) reaches $0.6V_{nom}$ and the voltage of $C_{11}$ ($V_{11}$) reaches $0.5V_{nom}$. Then $S_{21}$ is turned off and $S_{22}$ is turned on; and the bus voltage drops back down to $0.9V_{nom}$. Then, the voltage of $C_{22}$ rises to $0.5V_{nom}$ and the voltage of $C_{11}$ reaches $0.6V_{nom}$, and the bus voltage again reaches $1.1V_{nom}$. Next, $S_{22}$ is turned off, $S_{23}$ is turned on and $C_{23}$ is charged. This process is repeated until $C_{25}$ is charged. This charging pattern is identical to the original 2-6 bipolar SSC energy buffer, as can be seen by comparing FIGS. 15A and 18A. However, the next two states are different, instead of charging $C_{11}$ in series with $C_{26}$, $C_{11}$ is charged directly by timing off $S_{h1}$ and turning on $S_{h3}$. Hence, eliminating the need for capacitor $C_{26}$ and switch $S_{26}$ of the original design. This state is maintained until voltage of $C_{11}$ rises to $1.1V_{nom}$. After this $S_{h4}$ is turned off and $S_{22}$ and $S_{25}$ are turned on. Now $C_{11}$ can continue to charge up through the now reverse-connected supporting capacitors through a process similar to the one described above, except that the supporting capacitors are discharged in reverse order, i.e., first through $C_{26}$, then through $C_{25}$, and so on until finally through $C_{21}$.

At this stage $C_{11}$ is fully charged to $1.6V_{nom}$ and charging of $C_{12}$ must begin. For this the h-bridge switches are again toggled (i.e., $S_{h3}$ and $S_{h2}$ are turned off, and $S_{h1}$ and $S_{h4}$ are turned on), $S_{11}$ is turned off and $S_{12}$ is turned on. The charging process for $C_{12}$ is identical to the charging process for $C_{11}$. The switch states, the capacitor voltages and the resulting bus voltages over a complete charge and discharge cycle are shown in FIG. 18A. During the discharge period, the capacitors $C_{11}$ and $C_{12}$ are discharged one at a time through a process that is the reverse of the charging process. Hence, the voltage waveforms during the discharge period are a mirror of those in the charging period.

Throughout the charging and discharging period of this energy buffer, the bus voltage stays within the $0.9V_{nom}$-$1.1V_{nom}$ range. Hence the enhanced 2-5 bipolar SSC energy buffer operated in this matter also has a voltage ripple ratio of 10%. Furthermore, it has an energy buffering ratio of 79.73% which is higher than the energy buffering ratio (79.6%) of the original 2-6 bipolar SSC energy buffer. The original 2-6 bipolar SSC energy buffer has 8 capacitors and 12 switches, while the enhanced 2-5 bipolar SSC energy buffer has 7 capacitors and 11 switches. Hence, the enhanced version achieves the same bus voltage ripple ratio and a slightly better energy buffering ratio with fewer capacitors and switches.

Assuming that all capacitors have the same capacitance, the energy buffering ratio ($\Gamma_b$) for an enhanced n-m bipolar SSC energy buffer is given by:

$$\Gamma_b = n[(1+(m+1)R_v)^2 - (1-(m+1)R_v)^2]/[n(1+(m+1)R_v)^2 + (2^2+3^2 \cdots +m^2)R_v^2] \quad \text{Eq. (11)}$$

The energy buffering ratio for the enhanced bipolar SSC energy buffer is plotted as a function of the number of supporting capacitors (m) for different number of backbone capacitors (n) with 10% voltage ripple ratio in FIG. 17. FIG. 17 also plots (as dashed lines) the energy buffering ratio of the original bipolar SSC energy buffer (as given by Eq. (10)). As can be seen from FIG. 17, the enhanced design achieves a slightly higher maximum energy buffering ratio than the original design. Furthermore, it achieves this higher maximum with fewer supporting capacitors than the original design.

An exemplary 2-5 enhanced bipolar SSC energy buffer circuit was built and tested with a power factor correction (PFC) circuit powering a dc load. The SSC energy buffer replaces the electrolytic capacitor normally connected at the output of the PFC, as shown in FIG. 3A. The SSC energy buffer is designed to meet a 10% bus voltage ripple ratio requirement on a 320V dc bus with a maximum load of 135 W.

Figure 19:
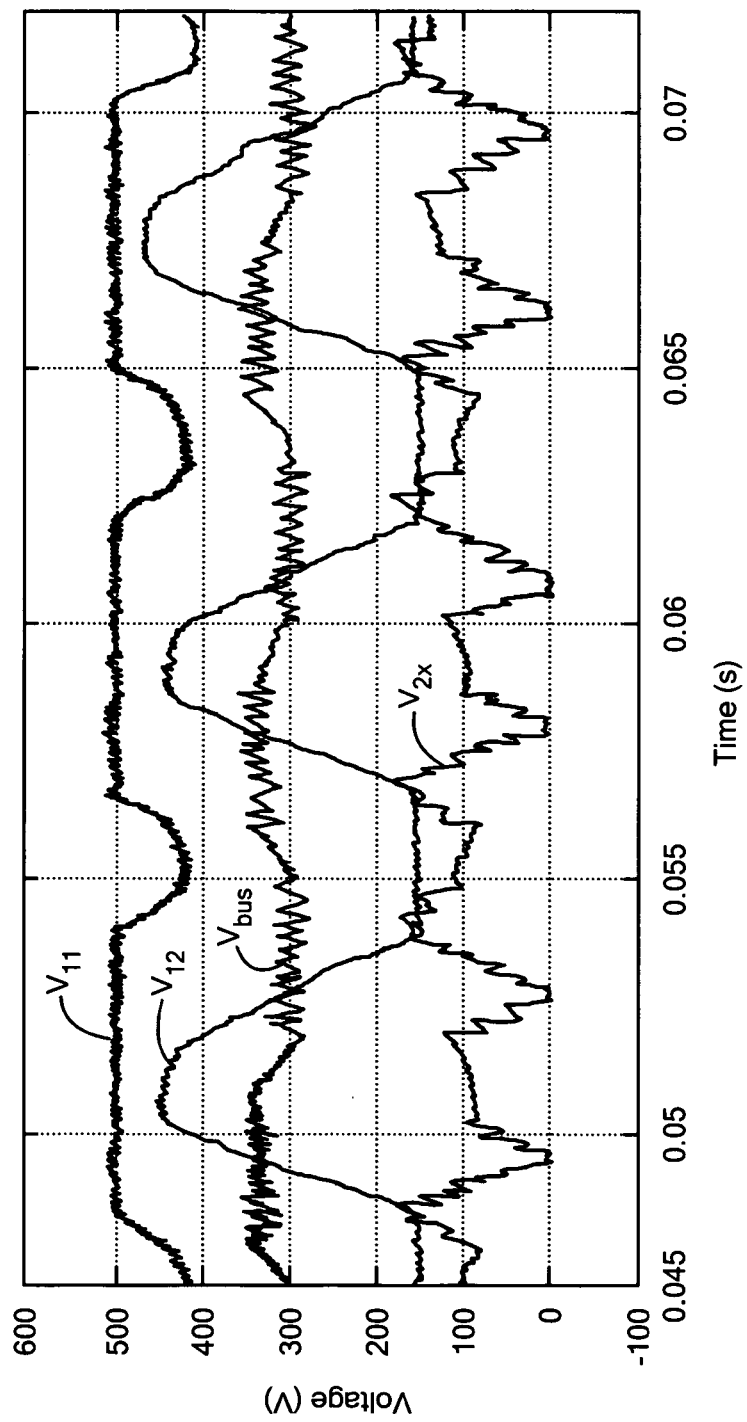
FIG. 19 is a plot of measured waveforms from a 2-5 enhanced bipolar SSC energy buffer circuit.

The measured waveforms from the 2-5 enhanced bipolar SSC energy buffer are shown in FIG. 19. Clearly, the enhanced SSC energy buffer maintains the bus voltage within the ±10% specified range. The roundtrip efficiency of the 2-5 enhanced bipolar SSC energy buffer across a wide load range was also measured and this data is plotted in FIG. 20.

Figure 20:
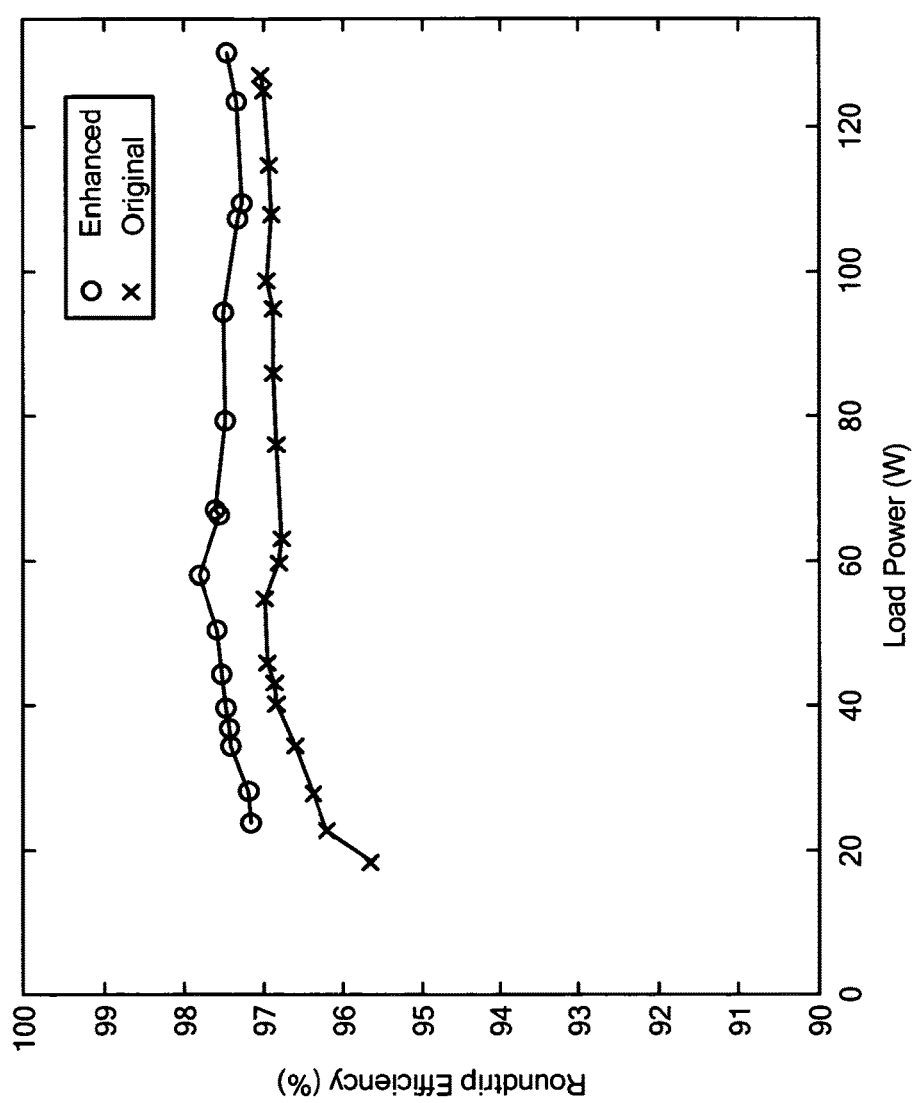
FIG. 20 is a plot of the measured roundtrip efficiency of an original 2-6 energy buffer circuit and a 2-5 enhanced bipolar SSC energy buffer circuit.

FIG. 20 also plots the measured roundtrip efficiency of the original 2-6 bipolar SSC energy buffer. As can be seen, the enhanced version has 1% higher roundtrip efficiency. This represents a 20-25% reduction in loss as compared to the original design. The full paper will also provide a more detailed experimental evaluation of the approach.

A stacked switched capacitor (SSC) architecture for dc-link energy buffering applications, including buffering between single-phase ac and dc has been described. This architecture utilizes the energy storage capability of capacitors more effectively than previous designs, while maintaining the bus voltage within a narrow range. This enables the energy buffer to achieve higher effective energy density and reduce the volume of the capacitors. A prototype 2-6 bipolar SSC energy buffer using film capacitors designed for a 320 V bus with 10% voltage ripple and able to support a 135 W load was built and tested and it is shown that the SSC energy buffer can successfully replace limited-life electrolytic capacitors with much longer life film capacitors, while maintaining volume and efficiency at a comparable level.

Also described is an enhanced version of the SSC energy buffer which modifies the control and switching pattern of the buffer switches to yield improved performance. A prototype enhanced SSC energy buffer, designed for a 320V bus and a 135 W load, was built and tested. The design rules and experimental results for the enhanced SSC energy buffer are also described. It is shown that the enhanced SSC energy buffer achieves a relatively high effective energy density and round-trip efficiency compared with other designs, while maintaining the same bus voltage ripple ratio. Furthermore, the enhanced design uses fewer capacitors and switches than other designs.

The techniques described herein are not limited to the specific embodiments described. Elements of different embodiments described herein may be combined to form other embodiments not specifically set forth above. Other embodiments not specifically described herein are also within the scope of the following claims.

What is claimed is:

1. A stacked switched capacitor (SSC) energy buffer circuit having a first terminal configured to be coupled to a first reference voltage and a second terminal configured to be coupled to a second reference voltage different from the first reference voltage, the circuit comprising:
   two sub-circuits that are serially coupled during a first operating mode wherein each sub-circuit comprises one or more capacitors, and at least one sub-circuit further comprises more than one capacitor and a plurality of switches disposed to selectively couple the capacitors to: (a) enable dynamic reconfiguration of how the capacitors are coupled to the terminals of the sub-circuit; and (b) dynamically reconfigure the interconnection among the capacitors within the sub-circuit.

2. The SSC energy buffer circuit of claim 1 wherein the switches in at least one of the two sub-circuits are arranged to dynamically reconfigure a polarity with which at least one capacitor is connected to the terminals of the sub-circuit.

3. The SSC energy buffer circuit of claim 1, further comprising a pre-charge circuit coupled to each of the two sub-circuits said pre-charge circuit operable to charge each of the one or more capacitors in the two sub-circuits to specified initial conditions before entering the first operating mode.

4. The SSC energy buffer circuit of claim 1 wherein at least one subcircuit comprises a plurality of sub-sub-circuits connected in parallel, wherein each sub-sub-circuit comprises a switch serially coupled to a capacitor.

5. The SSC energy buffer circuit of claim 1 wherein the peak energy buffered by one of the two sub-circuits is greater than 66% of the total peak energy buffering capability.

6. The SSC energy buffer circuit of claim 1 wherein the capacitors in at least one of the two sub-circuits are of a type that can be charged and discharged over voltage range within about 72% of a nominal voltage.

7. The SSC energy buffer circuit of claim 1 wherein the capacitors in at least one of the first and second blocks are provided as: one of film capacitors, ultra capacitors and electrolytic capacitors.

8. The SSC energy buffer circuit of claim 1 wherein the switches are disposed to selectively couple the capacitors to enable dynamic reconfiguration of both the interconnection among the capacitors and their connection to a buffer port.

9. The SSC energy buffer circuit of claim 1 wherein the switches are enabled to cooperatively operate as a switching network such that the voltage seen at a buffer port varies within about 12.5% of a nominal voltage as the capacitors charge and discharge over a voltage range of up to about 72% of a peak storage capacity of the capacitors to buffer energy.

10. A circuit comprising:
a first set of circuitry comprising:
m capacitors; and
m switches, the number of capacitors and switches being equal and wherein each m switch is serially coupled to a corresponding one of the m capacitors; and
a second set of circuitry comprising:
n and only n capacitors; and
n switches, the number of capacitors and switches being equal and wherein each n switch is serially coupled to a corresponding one of the n capacitors;
wherein a voltage across the first set of circuitry and the second set of circuitry is a bus voltage,
wherein the circuit is configured to maintain the bus voltage within a predetermined range of a nominal value, and
wherein n and m are integers greater than zero.

11. The circuit of claim 10 wherein the first set of circuitry includes an H-bridge switch and wherein said H-bridge switch is disposed to allow at least some of said m capacitors to be charged in a bipolar fashion.

12. The circuit of claim 10 wherein n=2 and m=4, and wherein the circuit has an energy buffering ratio, $\gamma_b$ of 81.6%.

13. The circuit of claim 10 wherein n=1 and m=3, and wherein the circuit has an energy buffering ratio of:

$$Y_b = \frac{nC_1\left[\left(1+2mR_v\frac{C_2}{C_1+C_2}\right)^2 - \left(1-2mR_v\frac{C_2}{C_1+C_2}\right)^2\right]}{nC_1\left[\left(1+2mR_v\frac{C_2}{C_1+C_2}\right)^2 - C_2(1+2^2+\ldots+m^2)R_v^2\right]},$$

where $R_v$ is the voltage ripple ratio, $C_1$ is the capacitance of the n capacitor and $C_2$ is the capacitance of one of the m capacitors which are equal in capacitance.

14. The circuit of claim 10 wherein the circuit has an energy buffering ratio of:

$$Y_b = \frac{n[(1+(m+1)R_v)^2 - (1-(m+1)R_v)^2]}{n[(1+(m+1)R_v)^2 - (2^2+3^3+\ldots+(m+1)^2R_v^2)]}$$

where $R_v$ is the voltage ripple ratio, $C_1$ the capacitance of the n and m capacitors are equal.

15. The circuit of claim 10 wherein the m and n capacitors are film capacitors.

16. The circuit of claim 10 wherein the m capacitors have the same capacitance.

17. The circuit of claim 10 wherein the n capacitors have the same capacitance.

18. The circuit of claim 10 wherein the m and n capacitors have the same capacitance.

19. The circuit of claim 10, further comprising a switch coupled to said m capacitors, and wherein m=3 and n=1, and wherein the circuit has an energy buffering ratio, $\gamma_b$ of about 72.7%.

20. The circuit of claim 10 wherein n=1, and
wherein an energy buffering ratio is equal to:

$$Y_b = \frac{[(1+R_v)^2 - (1-mR_V)^2]C_1 + (mR_v)^2}{C_1(1+R_v)^2 + C_2(1+2^2+\ldots+m^2)R_v^2}$$

where $R_v$ is the voltage ripple ratio, $C_1$ is the capacitance of the n capacitor and $C_2$ is the capacitance of one of the m capacitors which are equal in capacitance.

21. A grid interface power converter system comprising:
a stacked switched capacitor (SSC) energy buffer circuit coupled between a DC-DC converter and an AC-DC converter, said stacked switched capacitor (SSC) energy buffer circuit comprising:
two sub-circuits that serially coupled during a first operating mode wherein each sub-circuit comprises one or more capacitors, and at least one sub-circuit further comprises more than one capacitor and a plurality of switches disposed to selectively couple the capacitors to: (a) enable dynamic reconfiguration of how the capacitors are coupled to the terminals of the subcircuit; and (b) dynamically reconfigure the interconnection among the capacitors within the subcircuit.

22. The circuit of claim 21 said SSC energy buffer circuit comprises:
a first set of circuitry comprising:
m and only m capacitors; and
m and only m switches, each m switch serially coupled to a corresponding one of the m capacitors; and a second set of circuitry comprising:
   n and only n capacitors; and
   n and only n switches, each n switch in series with a corresponding one of the n capacitors;
wherein a voltage across the first set of circuitry and the second set of circuitry is a bus voltage.

23. The circuit of claim 21 wherein the SSC energy buffer circuit is configured to maintain the bus voltage within ±12.5% of a nominal value.

24. The SSC energy buffer circuit of claim 21 wherein the switches in at least one of the two sub-circuits are arranged to dynamically reconfigure a polarity with which at least one capacitor is connected to the terminals of the sub-circuit.

25. The SSC energy buffer circuit of claim 21, further comprising a pre-charge circuit coupled to each of the two sub-circuits said pre-charge circuit operable to charge each of the one or more capacitors in the two sub-circuits to specified initial conditions before entering the first operating mode.

26. The SSC energy buffer circuit of claim 21 wherein at least one subcircuit comprises a plurality of sub-sub-circuits connected in parallel, wherein each sub-sub-circuit comprises a switch serially coupled to a capacitor.

27. The SSC energy buffer circuit of claim 21 wherein the peak energy storage capability of one of the two sub-circuits is greater than 66% of the total peak energy storage capability.

28. A stacked switched capacitor (SSC) energy buffer circuit having first and second terminals, the SSC energy buffer circuit comprising:
   a first sub-circuit comprising one or more capacitors;
   a second sub-circuit comprising more than one capacitors; and
   one or more switches disposed in at least one of said first and second sub-circuits to selectively couple said one or more capacitors and wherein said first and second sub-circuits are serially coupled during a first operating mode and wherein said one or more switches are operable to enable dynamic reconfiguration of how the capacitors are coupled to the terminals of the sub-circuit.

29. The SSC energy buffer circuit of claim 28 wherein said one or more switches are operable to dynamically reconfigure the interconnection among the capacitors within at least one of said first and second sub-circuits.

30. The SSC energy buffer circuit of claim 29 wherein in at least some operating modes, said one or more switches are operable to prevent the capacitors from ever being connected together at both terminals.

* * * * *

UNITED STATES PATENT AND TRADEMARK OFFICE
CERTIFICATE OF CORRECTION

| | | |
|---|---|---|
| PATENT NO. | : 9,762,145 B2 | Page 1 of 4 |
| APPLICATION NO. | : 14/362163 | |
| DATED | : September 12, 2017 | |
| INVENTOR(S) | : David J. Perreault et al. | |

It is certified that error appears in the above-identified patent and that said Letters Patent is hereby corrected as shown below:

Column 1, after paragraph 1 insert paragraph 2, erroneously deleted and replace with --As is known in the art, power conversion systems that interface between direct current (DC) and single-phase alternating current (AC) require an energy storage capability (or an energy buffer) which provides buffering between a constant power desired by a DC source or a load and a continuously varying power desired for a single-phase AC system.--

Column 1, Line 56, delete "/dis-charge" and replace with --discharge--

Column 1, Line 62, delete "develop" and replace with --developing--

Column 2, Line 13, delete "dc" and replace with --DC--

Column 2, Line 67, delete "(e.g. line-scale)" and replace with --(e.g., line-scale)--

Column 3, Line 9, delete "herein a" and replace with --herein, a--

Column 3, Line 10, delete "an first" and replace with --a first--

Column 3, Line 17, delete "fitter" and replace with --filter--

Column 3, Line 30, delete "herein a" and replace with --herein, a--

Column 4, Line 5, delete "not using utilizing" and replace with --not utilizing--

Column 4, Line 18, delete "sub circuit" and replace with --sub-circuit--

Column 4, Line 41, delete "in stored in" and replace with --stored in--

Column 4, Line 60, delete "Stacked Swithed Capacitor" and replace with --stacked switched capacitor--

Signed and Sealed this
Tenth Day of July, 2018

Andrei Iancu
*Director of the United States Patent and Trademark Office*

CERTIFICATE OF CORRECTION (continued)
U.S. Pat. No. 9,762,145 B2

Column 4, Line 62, delete "ac and dc." and replace with --AC and DC.--

Column 4, Line 66, delete "is circuit" and replace with --is a circuit--

Column 5, Line 50, delete "versus and the" and replace with --versus the--

Column 5, Line 67, delete "as stacked" and replace with --as a stacked--

Column 6, Line 2, delete "of an" and replace with --an--

Column 6, Line 13, delete "level, higher" and replace with --level, and higher--

Column 6, Line 57, delete "dc" and replace with --DC--

Column 7, Line 9, delete "series," and replace with --series.--

Column 7, Line 21, delete ",104" and replace with --, 104.--

Column 7, Line 24, delete ", $^{V}BUS$." and replace with --$V_{bus}$--

Column 7, Line 32, delete "capacitors electrolytic" and replace with --capacitors, electrolytic--

Column 8, Line 38, delete "capability" and replace with --capability.--

Column 9, Line 2, delete "$V_{room}$" and replace with --$V_{nom}$--

Column 9, Line 32, delete "$S_{h1}$, $S_{h1}$, ...," and replace with --$S_{h1}$, $S_{h2}$, ...,--

Column 9, Line 47, delete "of" and replace with --off--

Column 10, Line 35, delete "$V_{23}$ In" and replace with --$V_{23}$. In--

Column 10, Line 45, delete "caps" and replace with --capacitors--

Column 10, Line 62, delete "def" and replace with --of--

Column 11, Line 2, delete "in slightly" and replace with --in a slightly--

Column 11, Line 20, delete "402" and replace with --402'--

Column 11, Line 51, delete ", and respectively" and replace with --, respectively--

Column 11, Line 52, delete "to unipolar" and replace with --to a unipolar--

Column 11, Line 53, delete "info" and replace with --into--

CERTIFICATE OF CORRECTION (continued)
U.S. Pat. No. 9,762,145 B2

Column 11, Line 56, delete "voltages are placed" and replace with --voltages that are placed--

Column 11, Line 60, delete "with" and replace with --until--

Column 12, Line 27, delete "the first and second of circuitry," and replace with --to a first and second set of circuitry--

Column 12, Line 41, delete "switches $S_{h1}$ ("  and replace with --switches $S_{h1}$, $S_{h2}$, $S_{h3}$, $S_{h4}$ (--

Column 13, Line 2, delete "changes" and replace with --change--

Column 13, Line 3, delete "ration," and replace with --ratio,--

Column 13, Line 7, delete "ripple," and replace with --ripple ratio,--

Column 13, Line 19, delete "S11, C11, S12, C12" and replace with --$S_{11}$, $C_{11}$, $S_{12}$, $C_{12}$--

Column 13, Lines 21-22, delete "S21, C21, S22, C22, S23, C23, S24, C24, S25, C25, S26, C26" and replace with --$S_{21}$, $C_{21}$, $S_{22}$, $C_{22}$, $S_{23}$, $C_{23}$, $S_{24}$, $C_{24}$, $S_{25}$, $C_{25}$, $S_{26}$, $C_{26}$--

Column 13, Line 23, delete "Sh1, Sh2, Sh3, Sh4" and replace with --$S_{h1}$, $S_{h2}$, $S_{h3}$, $S_{h4}$--

Column 13, Line 56, delete "Buffer"]." and replace with --Buffer".--

Column 13, Line 66, delete "of number" and replace with --of a number--

Column 14, Line 55, delete "sac" and replace with --SSC--

Column 14, Line 66, delete "FIG. 15 or 18)" and replace with --FIGS. 15 or 18)--

Column 15, Line 22, delete "$S_{22}$" and replace with --$S_{h2}$--

Column 15, Line 29, delete "h-bridge" and replace with --H-bridge.--

Column 15, Line 62, delete "for different" and replace with --for a different--

Column 16, Line 6, delete "dc" and replace with --DC--

Column 16, Line 10, delete "dc" and replace with --DC--

Column 16, Line 25, delete "dc-" and replace with --DC- --

Column 16, Line 27, delete "ac and dc" and replace with --AC and DC--

Column 16, Line 34, delete "ripple and" and replace with --ripple ratio and--

CERTIFICATE OF CORRECTION (continued)
U.S. Pat. No. 9,762,145 B2

Column 16, Line 46, delete "high" and replace with --highly--

Column 17, Line 17, delete "subcircuit" and replace with --sub-circuit--

Column 17, Line 26, delete "over voltage" and replace with --over a voltage--

Column 18, Lines 59-60, delete "subcircuit;" and replace with --sub-circuit;--

Column 18, Line 61, delete "subcircuit." and replace with --sub-circuit.--

Column 19, Line 20, delete "subcircuit" and replace with --sub-circuit--

Column 20, Lines 21-22, delete "wherein in at" and replace with --wherein at--